(12) United States Patent
Suh

(10) Patent No.: US 7,525,581 B2
(45) Date of Patent: Apr. 28, 2009

(54) COMPACT DIGITAL ZOOM CAMERA AND CELLULAR PHONE HAVING THE SAME

(75) Inventor: Jae-Gyeong Suh, Changwon-si (KR)

(73) Assignee: Samsung Techwin Co., Ltd. (KR)

( * ) Notice: Subject to any disclaimer, the term of this patent is extended or adjusted under 35 U.S.C. 154(b) by 1009 days.

(21) Appl. No.: 10/829,422

(22) Filed: Apr. 21, 2004

(65) Prior Publication Data
US 2004/0212702 A1 Oct. 28, 2004

(30) Foreign Application Priority Data
Apr. 22, 2003 (KR) .................. 10-2003-0025526

(51) Int. Cl.
*H04N 5/262* (2006.01)
*G02B 15/14* (2006.01)

(52) U.S. Cl. .................. 348/240.3; 359/696; 359/700

(58) Field of Classification Search .............. 348/240.3, 348/335; 359/694, 695, 696, 699, 700, 701, 359/676; 396/85
See application file for complete search history.

(56) References Cited

U.S. PATENT DOCUMENTS

| | | | |
|---|---|---|---|
| 3,951,522 A * | 4/1976 | Hashimoto | 359/694 |
| 5,218,479 A * | 6/1993 | Chiou et al. | 359/700 |
| 6,072,639 A * | 6/2000 | Onda | 359/694 |
| 6,195,211 B1 * | 2/2001 | Iwasaki | 359/694 |
| 6,262,853 B1 * | 7/2001 | Takanashi et al. | 359/703 |
| 2003/0219244 A1 | 11/2003 | Suh | 396/85 |
| 2004/0130803 A1 * | 7/2004 | Iwasaki | 359/700 |

* cited by examiner

*Primary Examiner*—Tuan V Ho
*Assistant Examiner*—Jason Whipkey
(74) *Attorney, Agent, or Firm*—Park & Associates, IP Law LLC

(57) ABSTRACT

A compact digital zoom camera includes a module base having an image sensor therein, a gear train installed at a side of an upper surface of the module base, a lens guide base installed on the module base and having a guide cylinder portion integrally formed thereon in which at least two groups of linear guides are formed in a lengthwise direction thereof, a driving motor installed at a motor installation portion on the lens guide base to rotate the gear train, a cam barrel rotatably installed at an outer side of the lens guide base and having a cam barrel gear portion engaged with any gear of the gear train and at least two groups of cam slots formed there in, at least two lens frames having at least two groups of linear guide portions respectively inserted in the two groups of linear guides of the lens guide base and guided thereby and at least two groups of cam pins respectively inserted in insertion holes formed in the linear guide portions and fixed therein such that end portions of the two groups of cam pins are respectively inserted in at least two groups of cam slots formed in the cam barrel and restricted thereby, and at least two groups of lenses respectively fixed on the two groups of lens frames.

25 Claims, 28 Drawing Sheets

COMPACT DIGITAL ZOOM CAMERA AND CELLULAR PHONE HAVING THE SAME

This application claims priority of Korean Patent Application No. 2003-25526, filed on Apr. 22, 2003, in the Korean Intellectual Property Office, the disclosure of which is incorporated herein in its entirety by reference.

FIELD OF THE INVENTION

The present invention relates to a zoom camera, and more particularly, to a compact digital zoom camera module which can be installed in a portable electronic device such as a cellular phone, and a portable electronic device having the same.

DESCRIPTION OF THE RELATED ART

Digital cameras or zoom camera modules (to be referred in this disclosure as zoom camera(s) or digital zoom camera(s)) capable of photographing can be installed in compact portable devices such as cellular phones or PDAs (personal digital assistants). Since the digital camera installed in portable devices has a very small size suitable for the portable devices, the structure of the digital camera needs to be simplified. Thus, a short-focus camera having a relatively simple structure is adopted therefor.

An image photographed by using such a short-focus camera can be magnified by using a digital zoom. However, if the image is magnified by using a digital zoom, resolution of the image is lowered and its image quality is deteriorated.

To solve the above problem, installing a compact digital zoom camera at a portable device has been suggested. For example, Korean Patent Application No. 2002-29031 of the present assignee on May 24, 2002 discloses a compact digital zoom camera incorporated in a portable device. However, since the structure of the portable device is relatively complicated and an end portion of a zoom lens protrudes outside from the device, when an impact is applied to a barrel of the camera, the zoom lens may slip out of the device or a cam pin may be broken.

SUMMARY OF THE INVENTION

To solve the above and other problems, the present invention provides a new compact digital zoom camera for a portable device.

According to an aspect of the present invention, a compact digital zoom camera comprises a base member having an image sensor coupled thereto; a guide cylinder member including at least two groups of linear guide grooves formed in a lengthwise direction of the guide cylinder member; a driving motor for providing a rotational force; a cam barrel coupled to an outer circumference of the guide cylinder member and including at least two groups of cam slots formed therein the cam barrel and the guide cylinder member adapted to provide a relative rotation with respect to each other in response to the rotational force of the driving motor; at least two lens frames each having at least two linear guide portions radially extending outwards and respectively inserted in the corresponding linear guides grooves of the guide cylinder member for guiding the lens frames thereby, the lens frames having a plurality of cam pins radially extending outwards from the linear guide portions and respectively inserted in the corresponding cam slots of the cam barrel for guiding movement of the lens frames; and, at least two lenses respectively fixed in the corresponding lens frames.

The base member preferably includes a module base and a lens guide base, and a gear train coupled to the module base for rotating the cam barrel. The gear train is preferably mounted in a groove formed at one surface of the module base, and a filter is mounted in a groove formed at another surface of the module base such that the overall thickness of the zoom camera can be reduced.

A Wide limit protruding portion and a Tele limit protruding portion are formed on the motor installation portion of the base member to limit the rotation of the cam barrel by contacting protruding portions of the cam barrel.

The driving motor is preferably a DC driving motor.

A waveform of a voltage signal of a power applied to the driving motor is preferably a pulse waveform having a portion for applying the power and a portion for not applying the power, and the power is applied to a time limit for moving the lenses between a Tele zoom position and a Wide zoom position.

The at least two groups of linear guide grooves formed on the guide cylinder member are formed at an interval of 120° around the guide cylinder member.

The cam slots formed in the cam barrel includes first through third groups of cam slots, the cam slots of the first cam slot group are inclined in the opposite direction to that of the second cam slot group, and the cam slots of the third cam slot group have a reversed V shape.

An allowance is formed between an end portion of each of the cam slots and the corresponding cam pins when the cam barrel is in the Tele and Wide zoom state, respectively.

The at least two lenses are respectively mounted within their corresponding lens holders and the lens holders are respectively mounted within their corresponding lens frames.

At least two lens shields are respectively affixed on their corresponding lenses for limiting an optical path and protecting the lenses.

The zoom camera further comprises a gear train coupled to the base member, and the gear train includes a motor gear connected to a rotation shaft of the driving motor, at least one reduction gear to reduce the rotation speed of the driving motor, and a transmission gear engaged with the at least one reduction gear and configured to rotate the cam barrel. The gear train is preferably inserted in a groove formed in an upper surface of the base member.

An infrared ray shielding filter is arranged in front of the image sensor in the module base.

According to another aspect of the present invention, a digital zoom camera comprises a module base having an image sensor therein; an infrared ray shielding filter arranged in front of the image sensor in the module base; a gear train inserted in a groove formed in an upper surface of the module base; a lens guide base disposed on the module base and having a guide cylinder member integrally formed thereon, the guide cylinder member having at least two groups of linear guide grooves formed in a lengthwise direction thereof; a driving motor mounted on the lens guide base to rotate the gear train; a cam barrel rotatably coupled at an outer side of the guide cylinder member and having a cam barrel gear portion engaged with the gear train and at least two groups of cam slots formed around the cam barrel; at least two lens frames each having at least two linear guide portions radially extending outwards and respectively inserted in the corresponding linear guide grooves of the guide cylinder member for guiding the lens frames thereby, the lens frames having a plurality of cam pins radially extending outwards from the linear guide portions and respectively inserted in the corresponding cam slots of the cam barrel for guiding movement of the lens frames; and, at least two lenses respectively fixed in their corresponding lens frames.

According to another aspect of the present invention, a digital zoom camera comprises a module base having an image sensor coupled thereto; a gear train mounted on the module base; a driving IC for controlling the driving motor; a lens guide base disposed on the module base and having a guide cylinder member disposed thereon, the guide cylinder member including a linear guide groove formed in a lengthwise direction thereof; a driving motor mounted on the lens guide base to rotate the gear train; a cam barrel rotatably coupled at an outer side of the guide cylinder member and having a cam barrel gear portion engaged with the gear train and at least two cam slots formed around the cam barrel; at least two lens frames each including a linear guide portion radially extending outwards and inserted in the corresponding linear guide groove of the guide cylinder member for guiding the lens frames thereby, each of the lens frames including a cam pin radially extending outwards from the linear guide portion and inserted in the corresponding cam slot of the cam barrel for guiding movement of the lens frames; and, at least two lenses respectively fixed in their corresponding lens frames.

According to still other aspects of the present invention, a cellular phone or a portable electronic device incorporates a compact digital zoom camera thereto, wherein the zoom camera comprises a base member having an image sensor coupled thereto; a guide cylinder member including at least two groups of linear guide grooves formed in a lengthwise direction of the guide cylinder member; a driving motor for providing a rotational force; a cam barrel coupled to an outer circumference of the guide cylinder member and including at least two groups of cam slots formed therein the cam barrel and the guide cylinder member adapted to provide a relative rotation with respect to each other in response to the rotational force of the driving motor; at least two lens frames each having at least two linear guide portions radially extending outwards and respectively inserted in the corresponding linear guides grooves of the guide cylinder member for guiding the lens frames thereby the lens frames having a plurality of cam pins radially extending outwards from the linear guide portions and respectively inserted in the corresponding cam slots of the cam barrel for guiding movement of the lens frames; and, at least two lenses respectively fixed in the corresponding lens frames.

BRIEF DESCRIPTION OF DRAWINGS

The above and other features and advantages of the present invention will become more apparent by describing in detail preferred embodiments thereof with reference to the attached drawings in which.

DETAILED DESCRIPTION OF EMBODIMENTS

Figure 1:
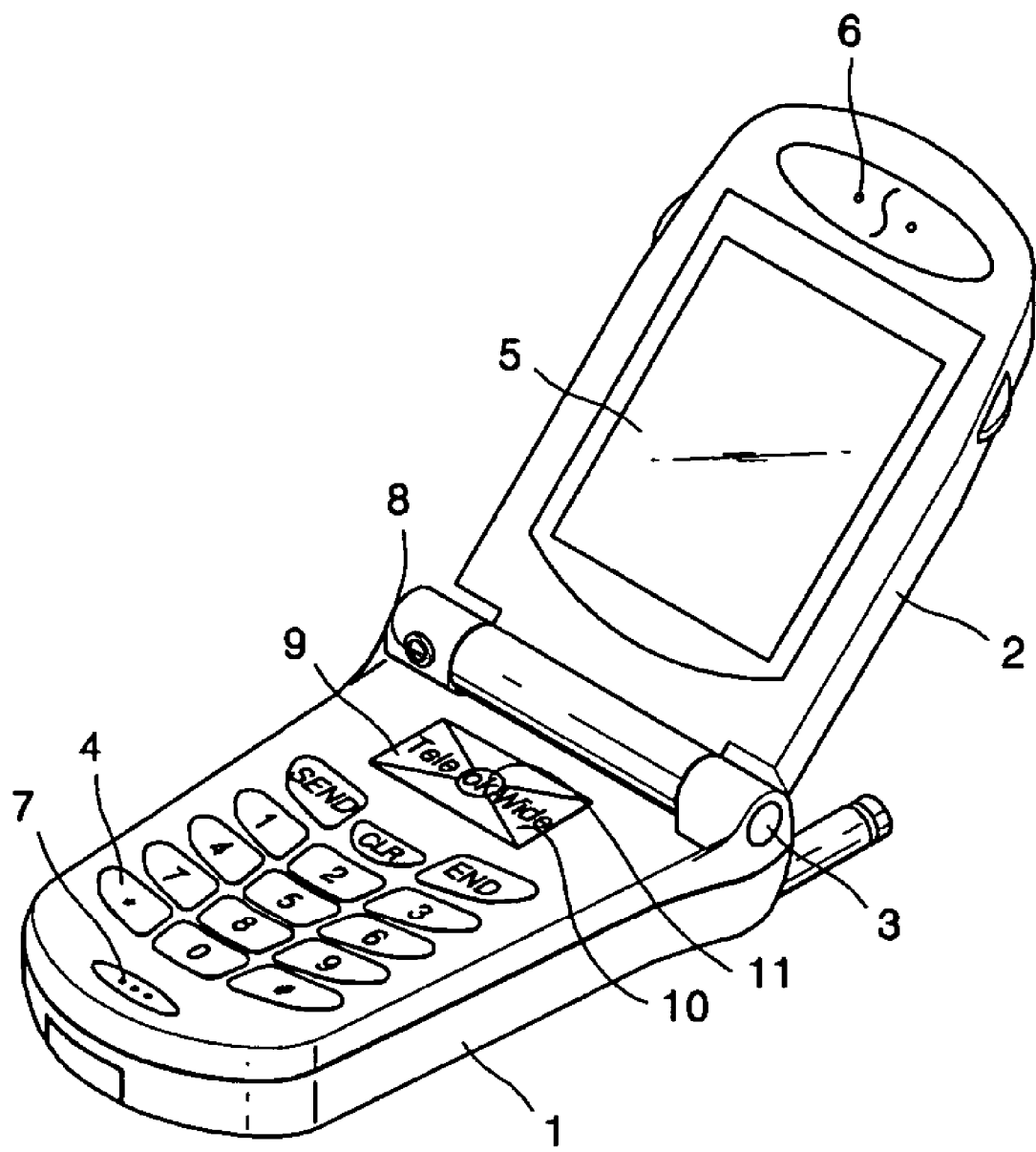
FIG. 1 is a perspective view illustrating a cellular phone having a compact digital zoom camera according to one preferred embodiment of the present invention.

Referring to FIG. 1, a cellular phone consists generally of a main body 1 and a folder 2 rotatably installed by a hinge 3 with respect to the main body 1. A plurality of alpha-numeric input buttons 4 is disposed on the main body 1. A microphone 7 is disposed at a suitable location of the main body 1 while a speaker 6 is disposed at an upper side of the folder 2. A digital zoom camera or zoom camera module 8 according to one preferred embodiment of the present invention is installed at a side adjacent to the hinge 3 of the folder 2. A "Tele" button 9 and a "Wide" button 10, which control a zooming operation of the digital zoom camera 8, are disposed on the main body 1. A release button 11 for activating a photographing operation is disposed on the main body 1.

Figure 2:
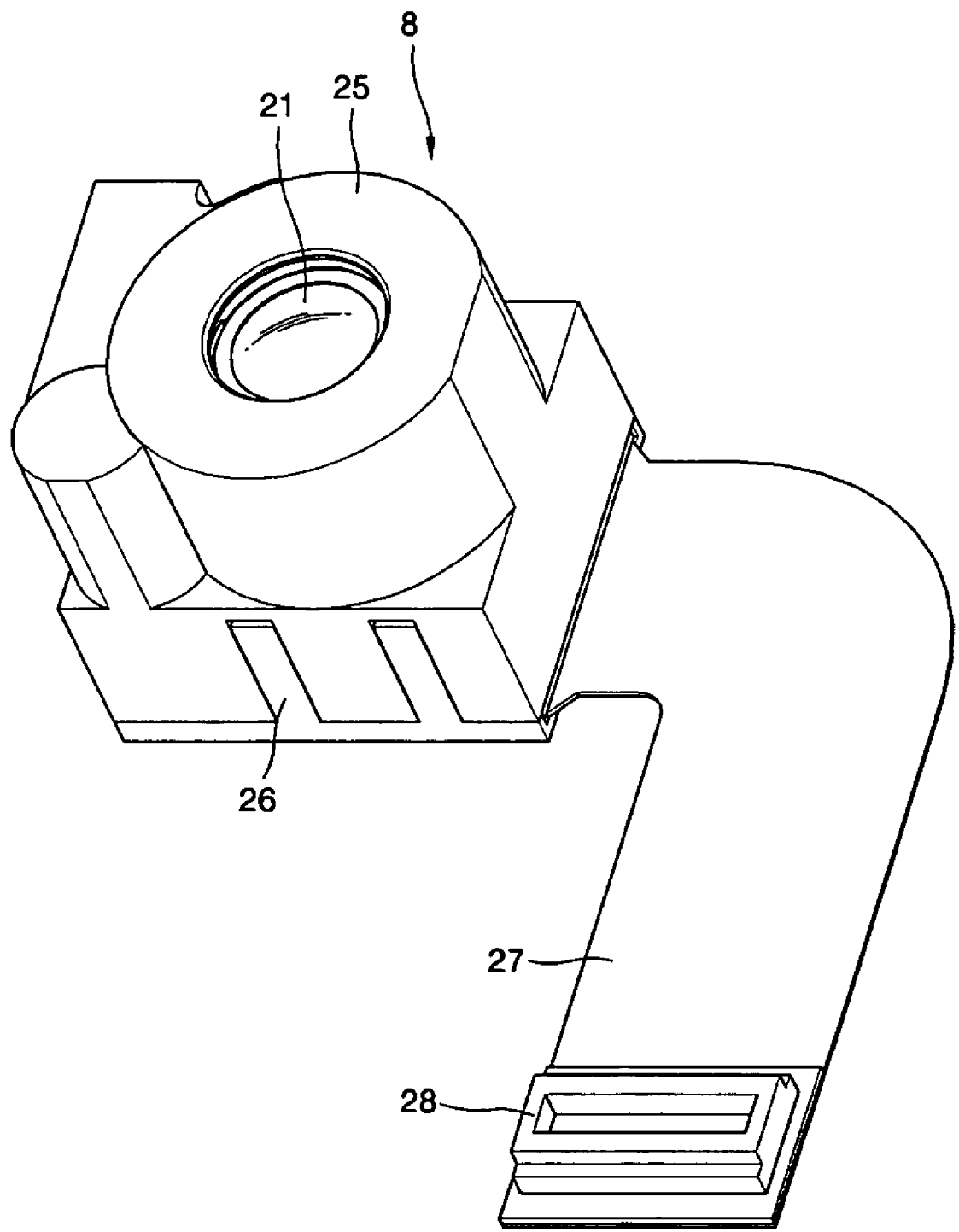
FIG. 2 is a perspective view illustrating a digital zoom camera separated from the cellular phone of FIG. 1.

FIG. 2 shows the digital zoom camera 8 which is separated from a portable electronic device such as the cellular phone shown in FIG. 1. Referring to FIG. 2, the digital zoom camera 8 is in the form of a module. A plurality of lenses (a front one is shown with reference 21), a driving motor (not shown), and a driving circuit (not shown) are provided in a space between a module cover 25 and a module base member 26, thereby forming a complete module. A connection flexible printed circuit board (PCB) 27 extends from the module to electrically connect the modularized digital zoom camera 8 to a portable device such as a cellular phone. A connector 28 is installed at a side of the connection flexible PCB 27 and connected to another connector (not shown) provided in the portable device.

Figure 3:
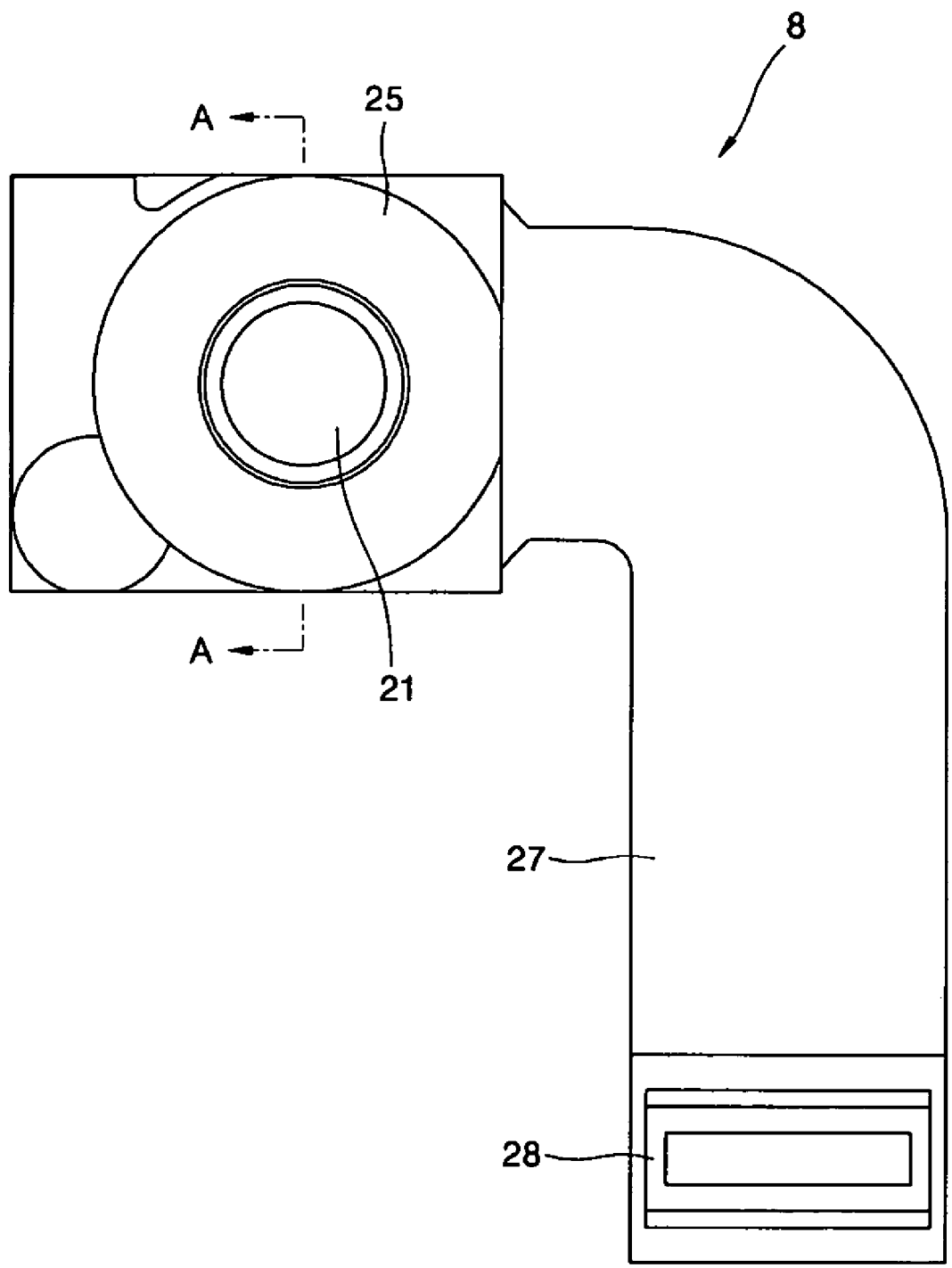
FIG. 3 is a plan view of the digital zoom camera of FIG. 2.
Figure 4:
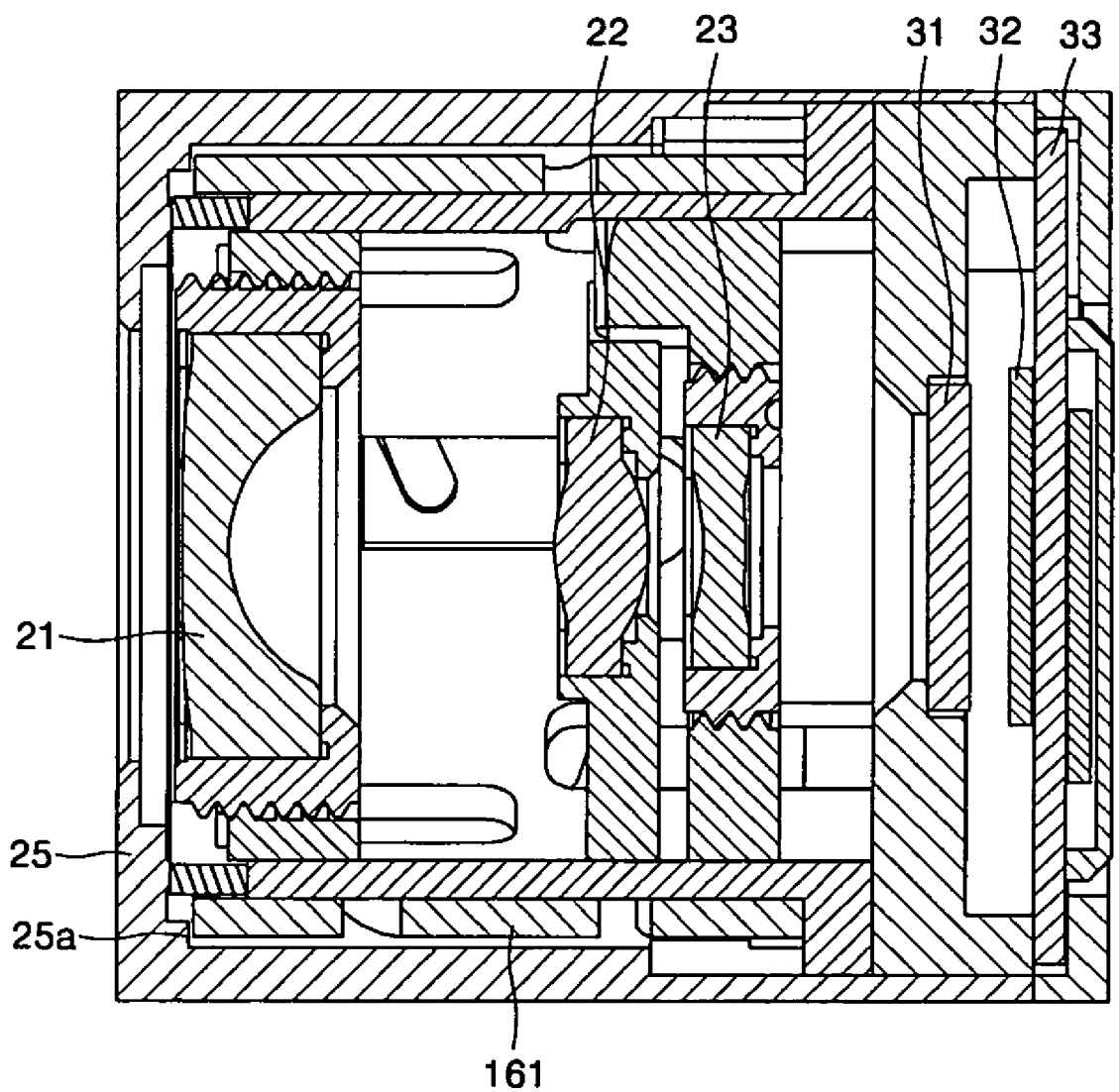
FIGS. 4 and 5 are sectional views, taken along line A-A of FIG. 3, in different zoom states.
Figure 5:
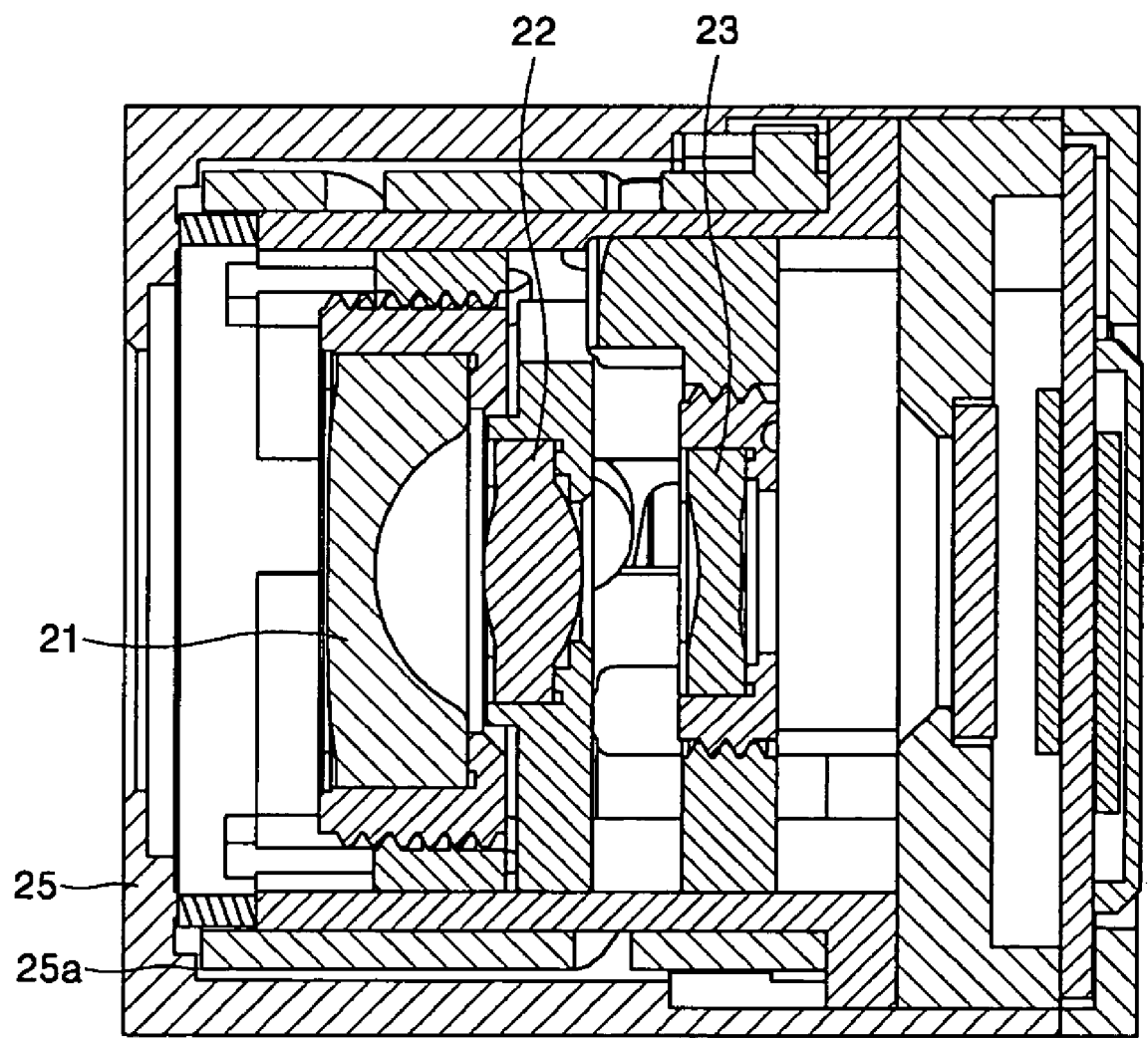

FIG. 3 is a plan view of the digital zoom camera of FIG. 2. FIGS. 4 and 5 are sectional views taken long line A-A of FIG. 3.

Referring to FIGS. 4 and 5, at least two lenses (for example, three) are disposed inside the module cover 25 of the digital zoom camera 8. In the present preferred embodiment, a first lens 21, a second lens 22, and a third lens 23 are movably disposed along the optical axis so that intervals there-between can be adjusted with respect to one another. An incident light passed through the first through third lenses 21, 22, and 23 is filtered by passing through an infrared ray shielding filter 31. The filtered light can be converted to electric signals after being incident on a well-known image sensor 32. The image sensor 32, such as a CCD sensor or a CMOS sensor, is affixed on a sensor PCB 33. In FIG. 4, the first lens 21 is displaced away from the second lens 22 toward the front side of the module cover 25, which is in a Wide state. In FIG. 5, the first lens 21 is positioned adjacent to the second lens 22, and thus, is displaced away from the front side of the module cover 25, which is in a Tele state.

In FIG. 4, a cam barrel projection preventing step 25a is formed on an inner surface of the module cover 25. The cam barrel projection preventing step 25a prevents a cam barrel 161 from projecting outside when the cam barrel 161 rotates and advances forward. The cam barrel projecting prevention step 25a has a shape generally corresponding to the circular edge of a distal portion of the cam barrel 161.

FIGS. 6 through 19 are perspective views, plan views, and sectional views illustrating the above-described digital zoom camera generally according to the respective assembly steps of the invention. The overall structure of the digital zoom camera according to the present invention is described below with reference to FIGS. 6 through 19.

Figure 6:
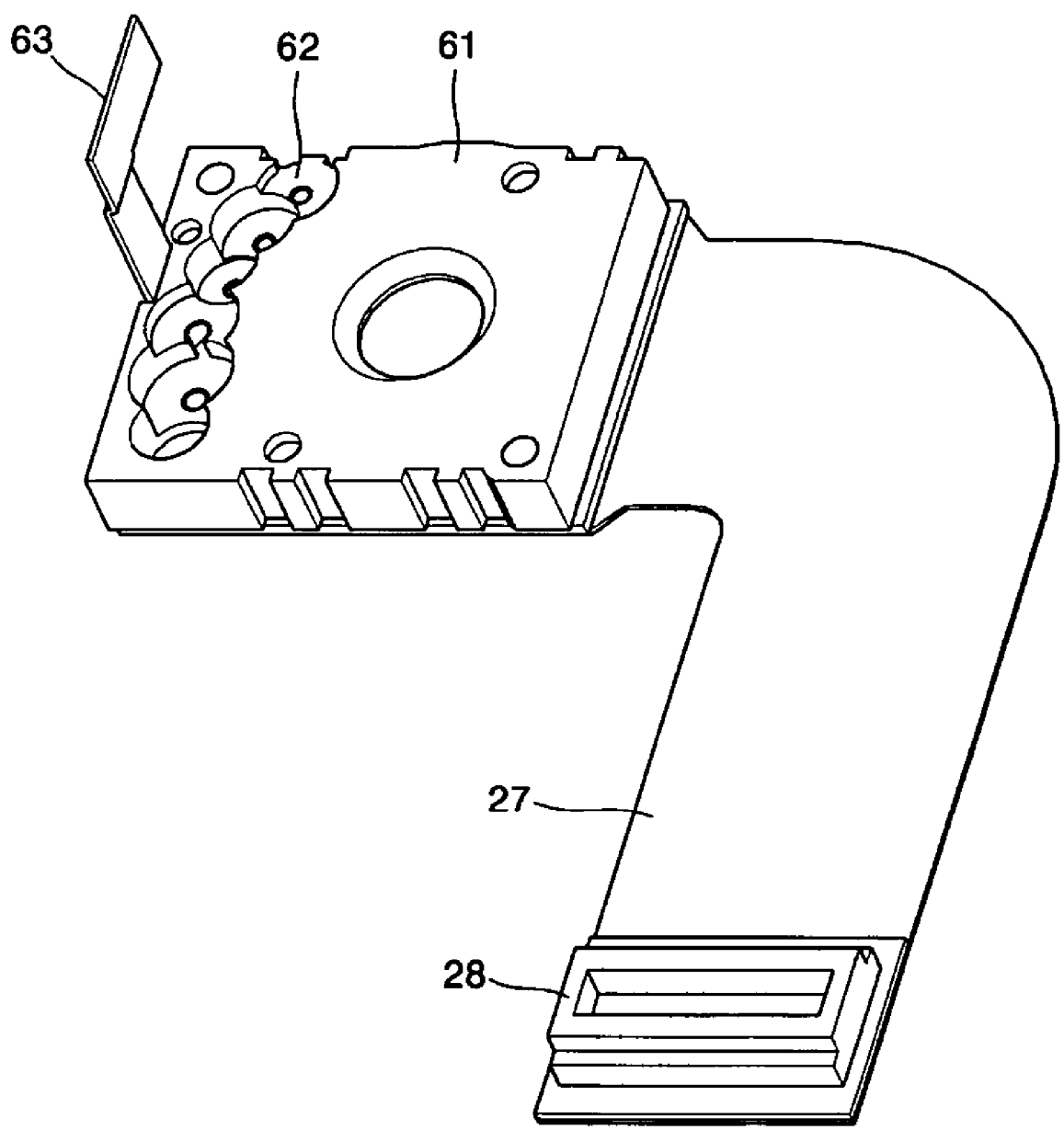
FIGS. 6 through 19 are perspective views, plan views, or sectional views illustrating the digital zoom camera of FIG. 2 according to the respective assembly steps of the invention.

Referring to FIG. 6, a gear train installation portion 62 is formed at one side of a module base 61. The gear train installation portion 62 is a groove having a predetermined shape formed at an upper surface of the module base 61 so that a plurality of gears can be installed therein. By forming the gear train installation portion 62 in the module base 61, the overall thickness of the camera module can be limited. A connection flexible PCB 27 is connected to a side of the sensor PCB 33 (FIGS. 4 and 8) disposed on a lower surface of the module base 61. A connector flexible PCB 63 is connected to the other side of the sensor PCB 33. The connector flexible PCB 63 is in turn connected to a printed circuit board (PCB) 143 (FIG. 14) of a motor driving IC 142 (FIG. 14) disposed on the module base 61. That is, driving of the motor driving IC 142 can be controlled via the connection flexible PCB 27, the sensor PCB 32 on a lower surface of the module base 61, and the connector flexible PCB 63.

Figure 7:
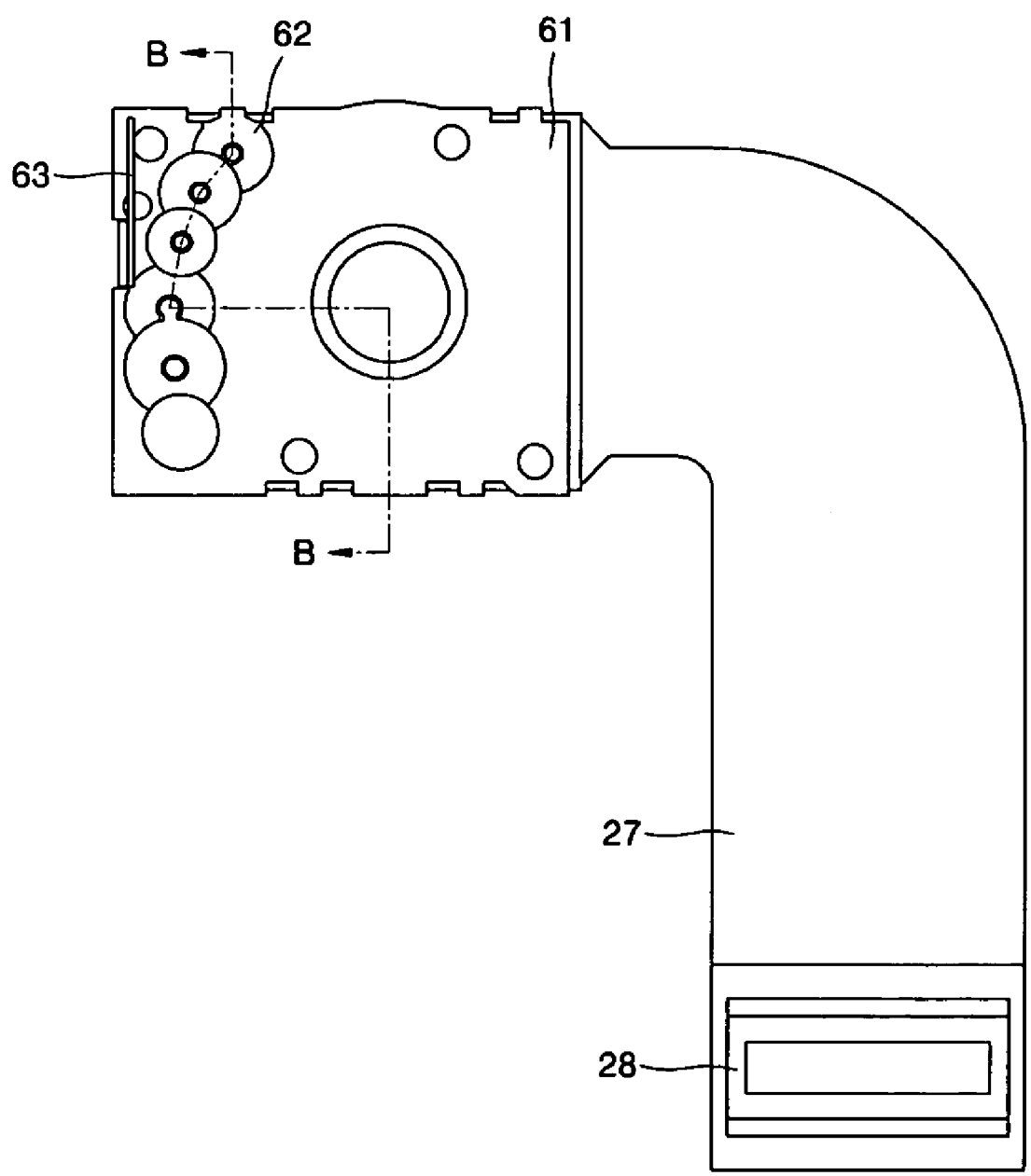
Figure 8:
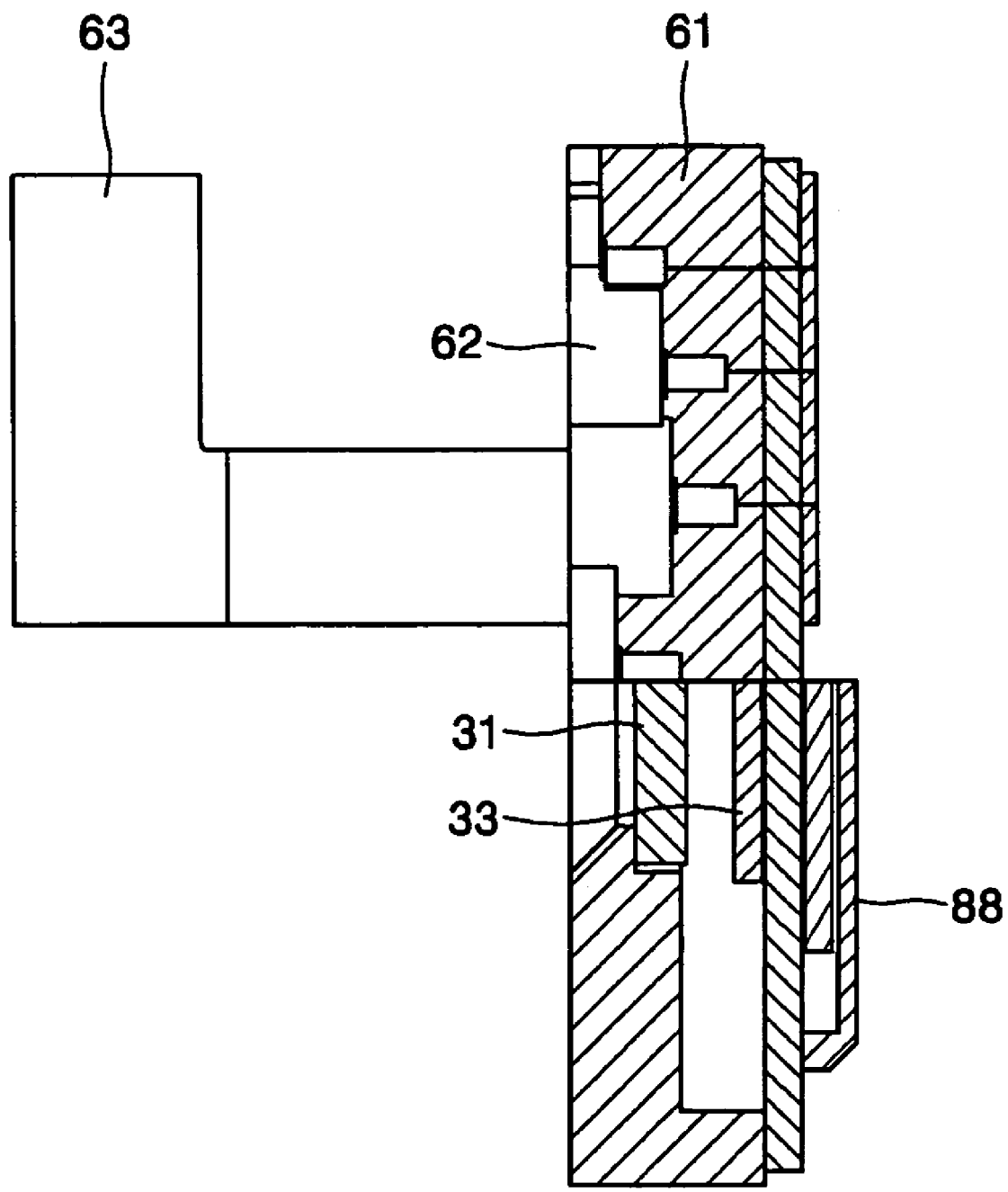

FIG. 7 is a plan view of the module base 61 shown in FIG. 6. FIG. 8 is a sectional view taken along line B-B of FIG. 7.

Referring to FIG. 8, the infrared ray shielding filter 31 is disposed in the module base 61, preferably mounted in a groove formed at a lower surface of the module base 61, and the sensor PCB 33 is disposed adjacent to a lower surface of the module base 61 as shown. Since the gear train is received in the gear installation portion (groove) 62 formed at one (upper) surface of the module base 61 as described and the infrared ray shielding filter 31 is also compactedly provided within the other (lower) surface of the module base 61, the thickness of the overall camera module can be further limited. As shown in FIGS. 8 and 6, the gear train mounting groove 62 is preferably formed at a lateral location that does not overlap the filter mounting groove which is formed centrally at the opposite surface of the module base such that the overall thickness of the zoom camera can further be reduced. Since the image sensor 32 is installed on the sensor PCB 33, the light passed through the infrared ray shielding filter 31 can be incident on the image sensor 32. The lower surface of the module base 61 is covered with a molding 88.

Figure 9:
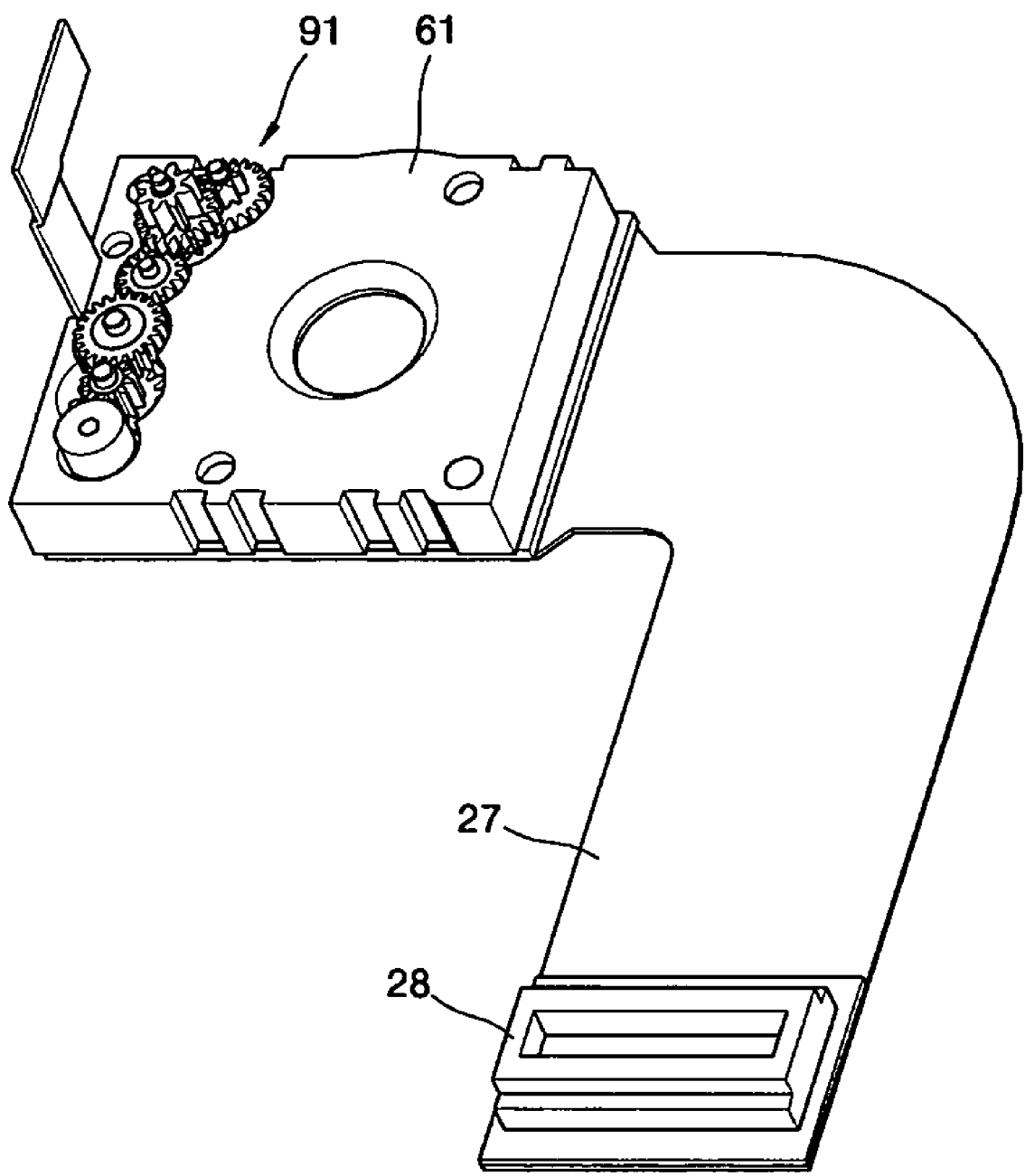
Figure 10:
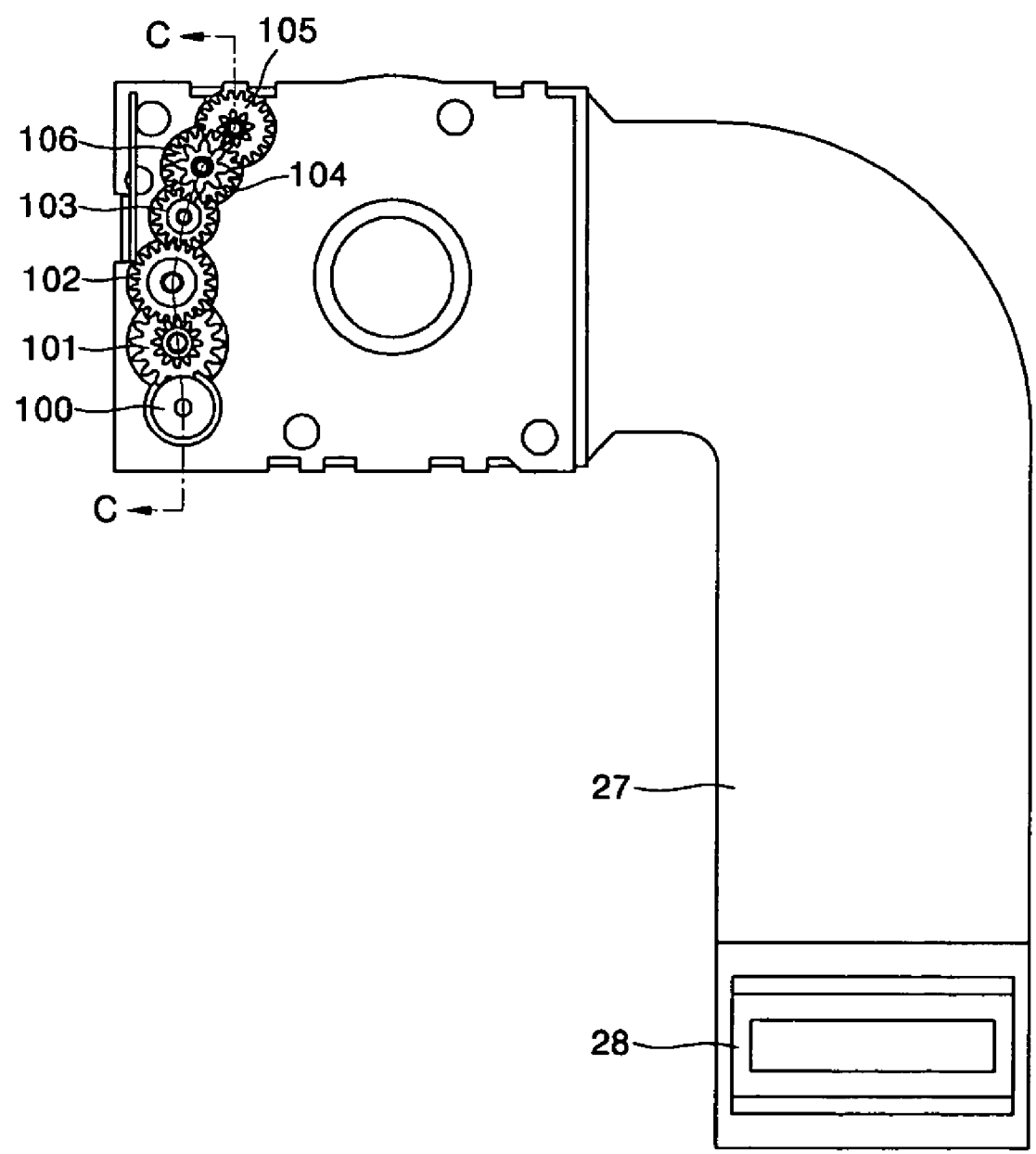
Figure 11:
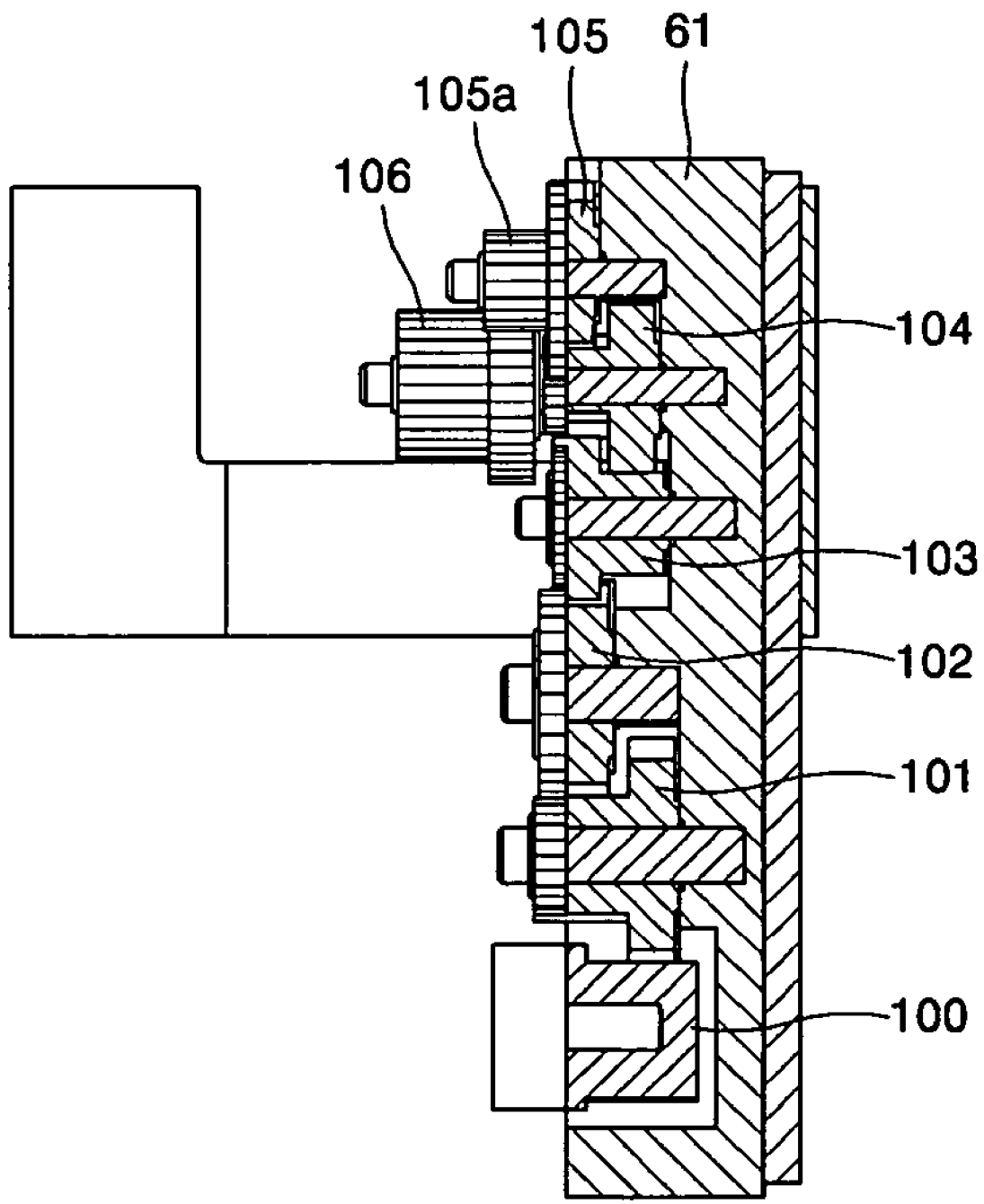

FIG. 9 illustrates that a plurality of gears 91 are installed in the gear train installation portion 62 of FIG. 6 formed at one side of the module base 61. As shown in FIG. 10, the gear train 91 includes a first reduction gear 101, a second reduction gear 102, a third reduction gear 103, a fourth reduction gear 104, a fifth reduction gear 105, and a transmission gear 106. Reference numeral 100 indicates a motor gear inserted onto an end portion of a drive rotation shaft of a driving motor 141 of FIG. 14. A rotational driving force transferred by the motor gear 100 is transmitted via the first through fifth reduction gears 101 through 105 and finally rotates the transmission gear 106. The transmission gear 106 is engaged with a cam barrel gear portion 175 (FIG. 17) of the cam barrel 161 (FIG. 16) to rotate the cam barrel 161. As can be seen from FIG. 11, a part of the fifth gear 105 is disposed above an upper flat surface of the module base 61 and engaged with the transmission gear 106. Also, since the transmission gear 106 is disposed at a position above the upper flat surface of the module base 61, it can be engaged with the cam barrel gear portion 175.

Figure 12:
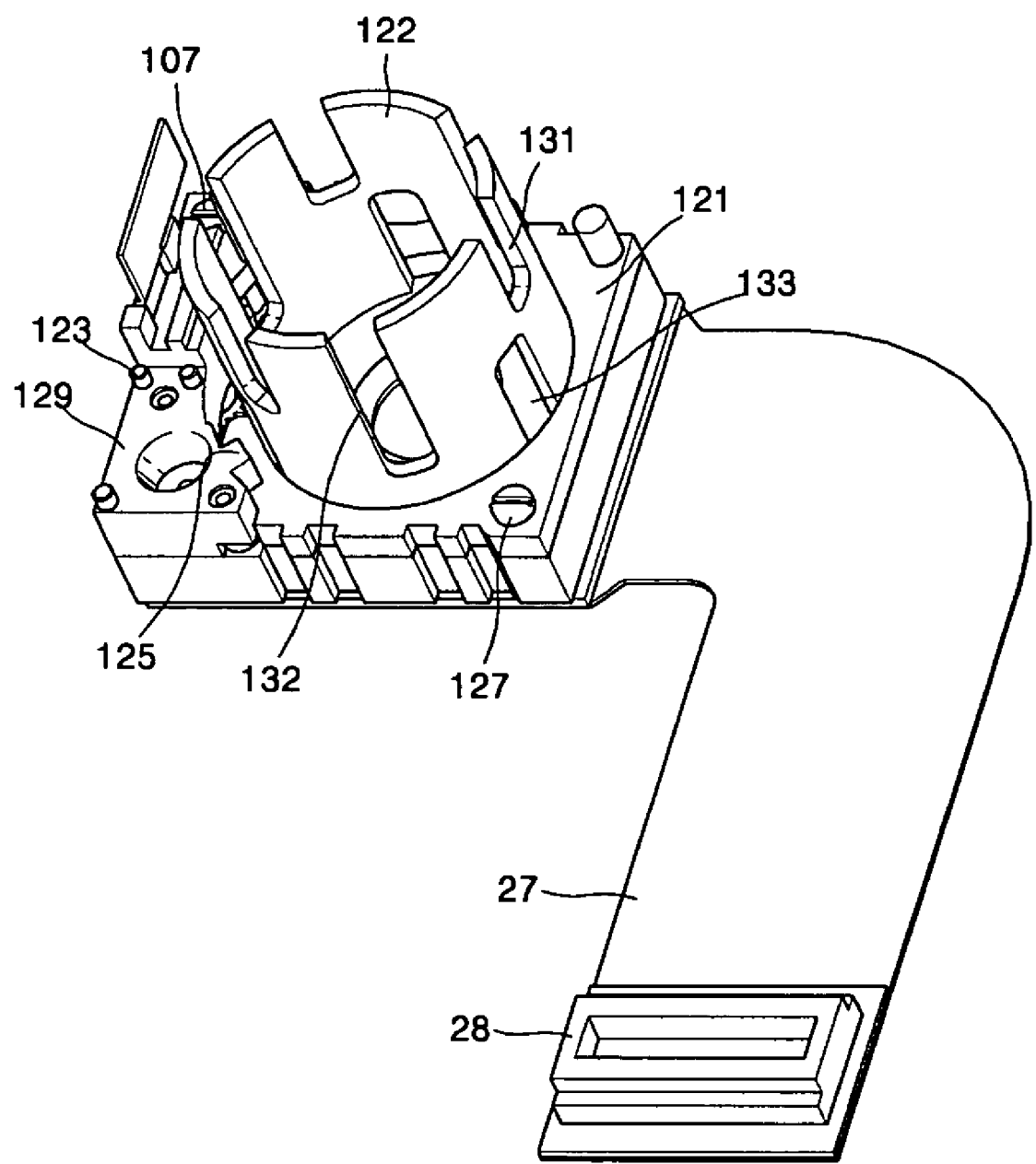

FIG. 12 illustrates that a lens guide base 121 is positioned on the module base 61 shown in FIG. 9. A guide cylinder member 122 is integrally formed with the lens guide base 121. Also, a driving motor installation portion 129 is located at a side of the lens guide base 121.

At least two groups (sets) of linear guide grooves are formed in the circumference of the guide cylinder member 122 disposed on the lens guide base 121. In the illustrative embodiment shown in FIG. 12, a first linear guide groove 131, a second linear guide groove 132, and a third linear guide groove 133 are formed. The first, second, third linear guide grooves 131, 132, and 133 are formed in a lengthwise (optical) direction on a circumferential surface of the guide cylinder member 122 to guide the first, second, and third lenses 21, 22, and 23. As it can be seen from the drawing figure, the first linear guide groove 131 extends from a middle portion of the guide cylinder member 122 to an upper portion thereof, the second linear guide groove 132 extends from the middle portion to the upper portion, and the third linear guide groove 133 extends from the middle portion to a lower portion thereof. First, second, and third lens frames 201, 202, and 203 of FIG. 22 receive therein the first, second, and third lenses 21, 22, and 23, respectively. First, second, and third guide portions 211, 212, and 213 are formed outside the first, second, and third lens frames 201, 202, and 203, respectively. The first, second, and third guide portions 211, 212, and 213 are inserted in the first through third linear guide grooves 131, 132, and 133, respectively. Thus, the first, second, and third lenses 21, 22, and 23 can advance or retract along the guide cylinder member 122 so that the intervals between the lenses can be adjusted. In the guide cylinder member 122, each of the first through third linear guide grooves 131, 132, and 133 are formed as a group having three grooves for each group, so that a total of nine guide grooves are provided.

The lens guide base 121 is fixed to the module base 61 (FIG. 9) by a bolt 127. According to one preferred embodiment of the invention, the module base 61 and the lens guide base 121 constitute a base member of the zoom camera to which other components (e.g., the sensor PCB 33) can be coupled for functioning as a camera module as described. The driving motor 141 (FIG. 14) is installed on the motor installation portion 129 of the lens guide base 121. A rotation shaft of the driving motor 141 extends through a hole formed in the motor installation portion 129 for coupling with the motor gear 100 shown in FIG. 10.

Figure 13:
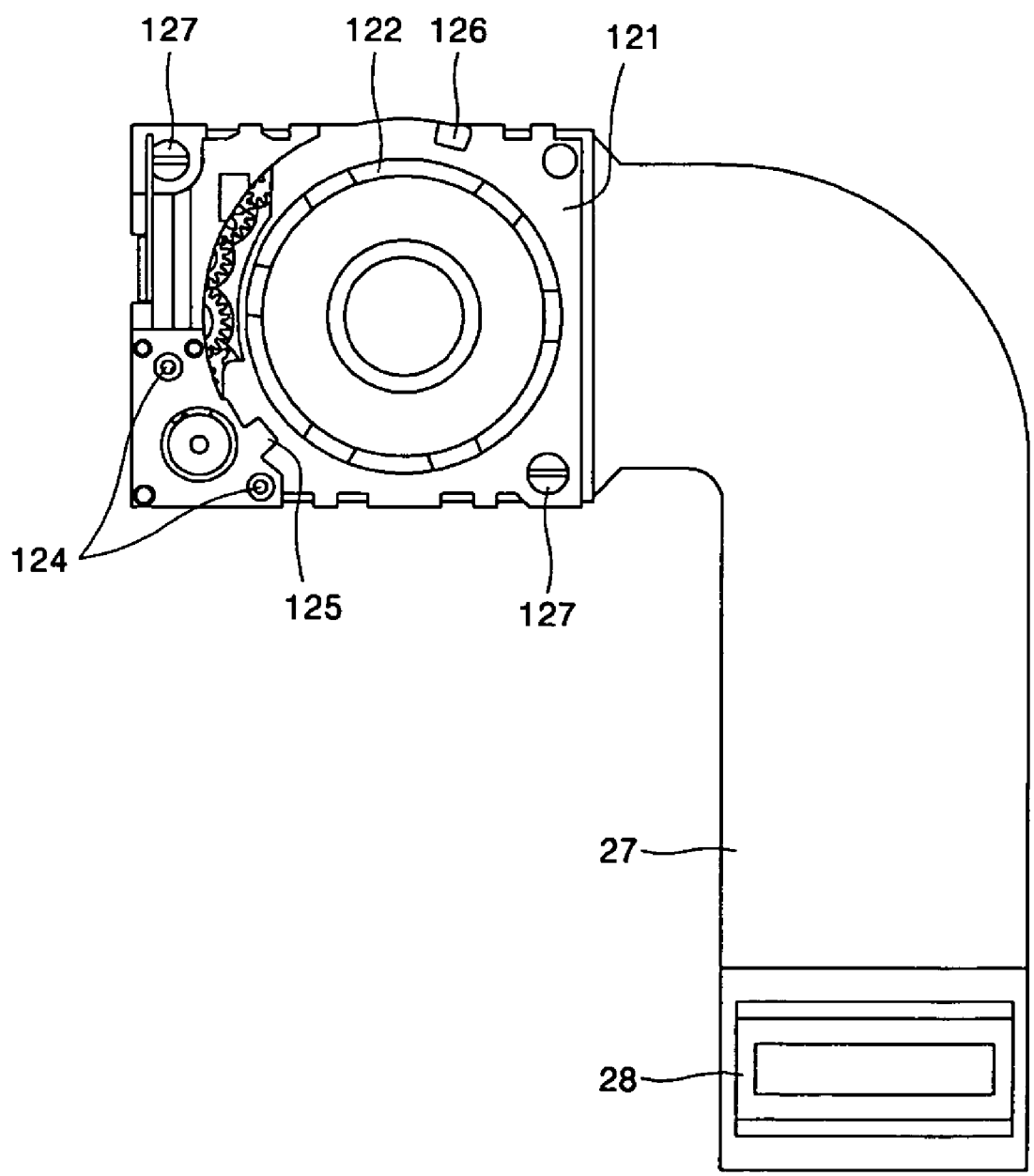
Figure 17:
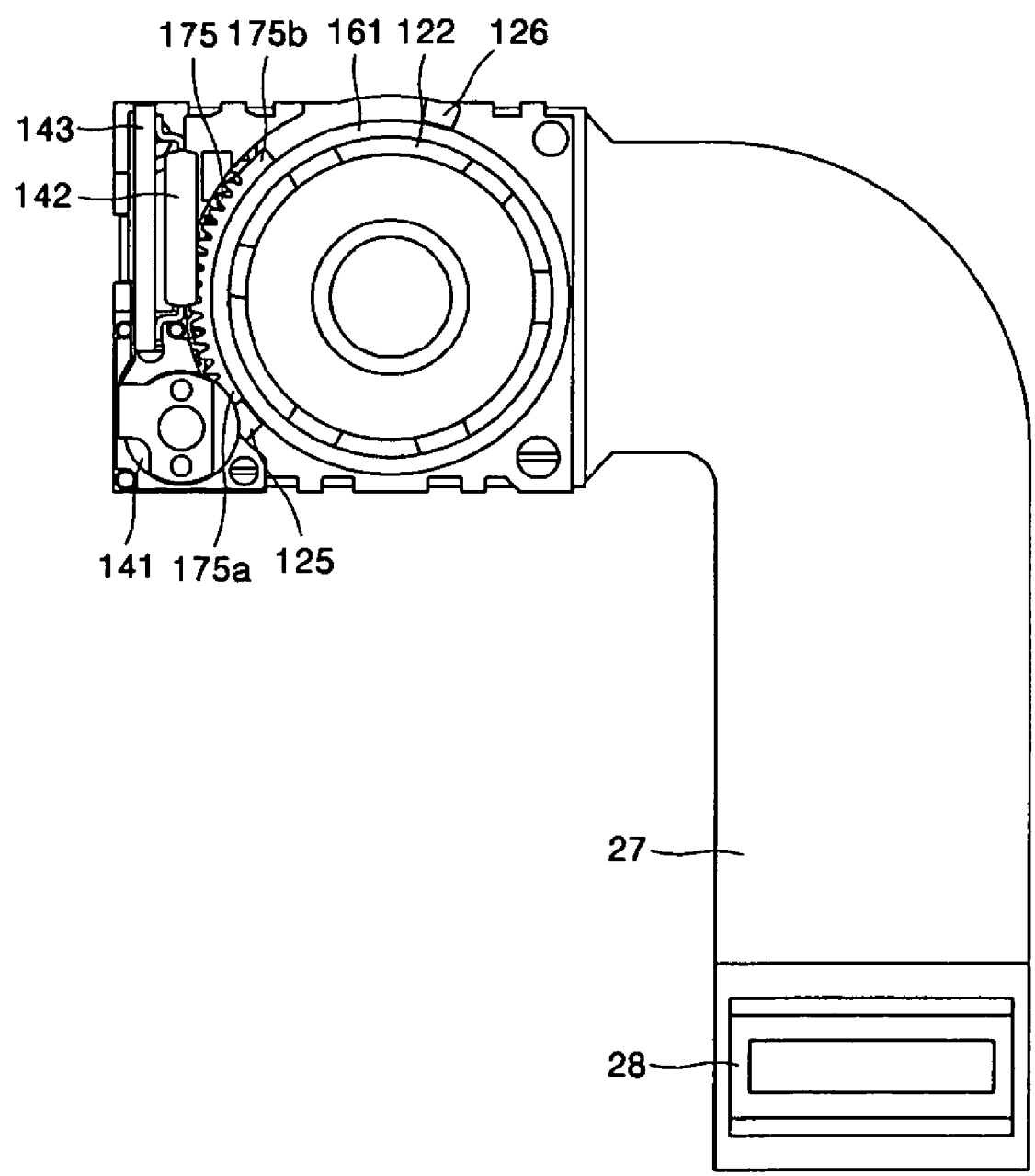

A Wide-limit protruding portion 125 is formed at a side of the motor installation portion 129 and functions as a stopper to the cam barrel gear portion 175 formed on an outer circumference of the cam barrel 161 as shown in FIG. 17. That is, as a side surface 175a of the cam barrel gear portion 175 contacts the Wide limit protruding portion 125, the cam barrel 161 is prevented from rotating in one direction (counterclockwise in the drawing figure). As shown in FIGS. 13 and 17, a Tele-limit protruding portion 126 is formed at a side of the lens guide base 121. As the Tele limit protruding portion 126 contacts the other side surface 175b of the cam barrel gear portion 175 of FIG. 17, it prevents the cam barrel 161 from rotating in the other direction (clockwise in the drawing figure).

Figure 14:
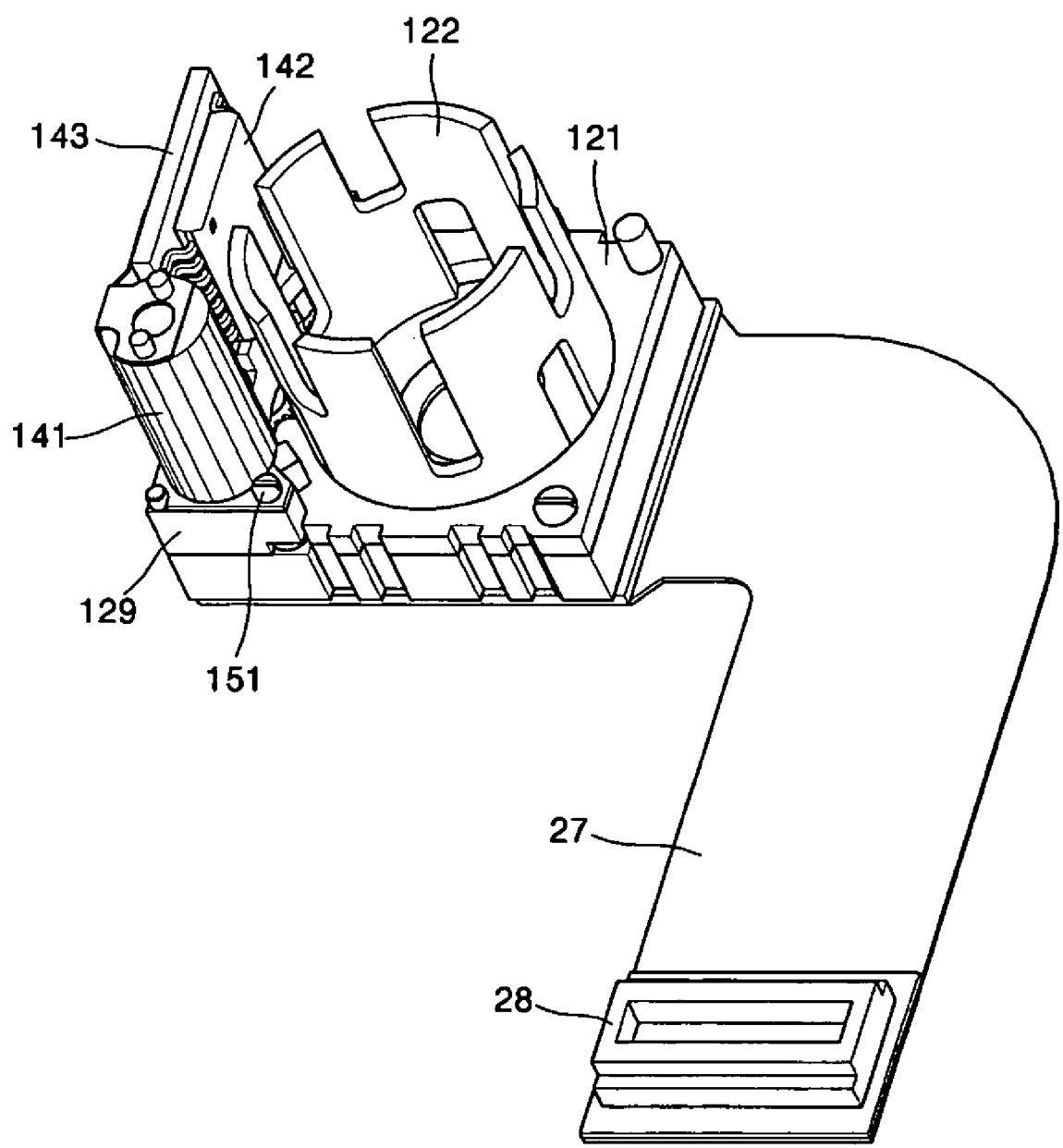
Figure 15:
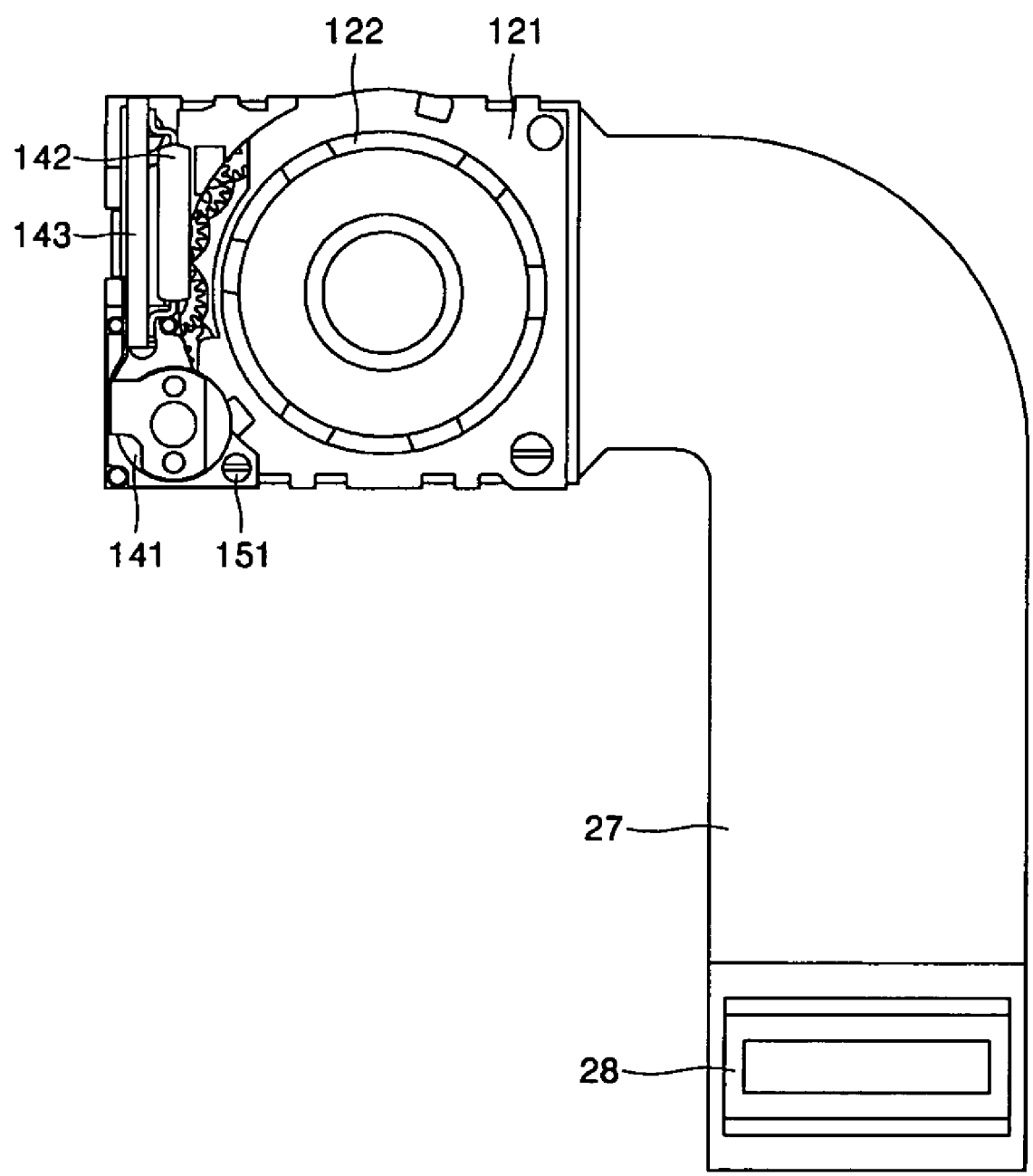

Referring to FIGS. 14 and 15, the driving motor 141 is installed on the motor installation portion 129, and the PCB 143 and the motor driving IC 142 are installed on the lens guide base 121. The motor driving IC 142 is mounted on the PCB 143 and connected to the connector flexible PCB 63 shown in FIG. 6. In conventional art, the motor driving IC is not mounted on the PCB of the camera module, but on a PCB of a portable device such as a cellular phone. In such a case, the modularization of the camera is not possible and an efficient use of current is not available. In the present invention, as the motor driving IC 142 is installed in the camera module, the remaining space in the portable device can be effectively utilized and also current can be efficiently used.

A stepping motor or a DC motor can be used as the driving motor 141. Preferably, a DC motor which has a greater driving force available in a cheaper price is used. If a stepping motor is used, since the amount or number of rotations corresponding to the driving pulses can be calculated, and a zoom position between a Wide mode and a Tele mode can be precisely determined. However, it has a disadvantage that the driving force of the stepping motor is not strong. Utilizing the DC motor, the position of the zoom lens can be recognized by using a detector such as a photosensor.

Figure 16:
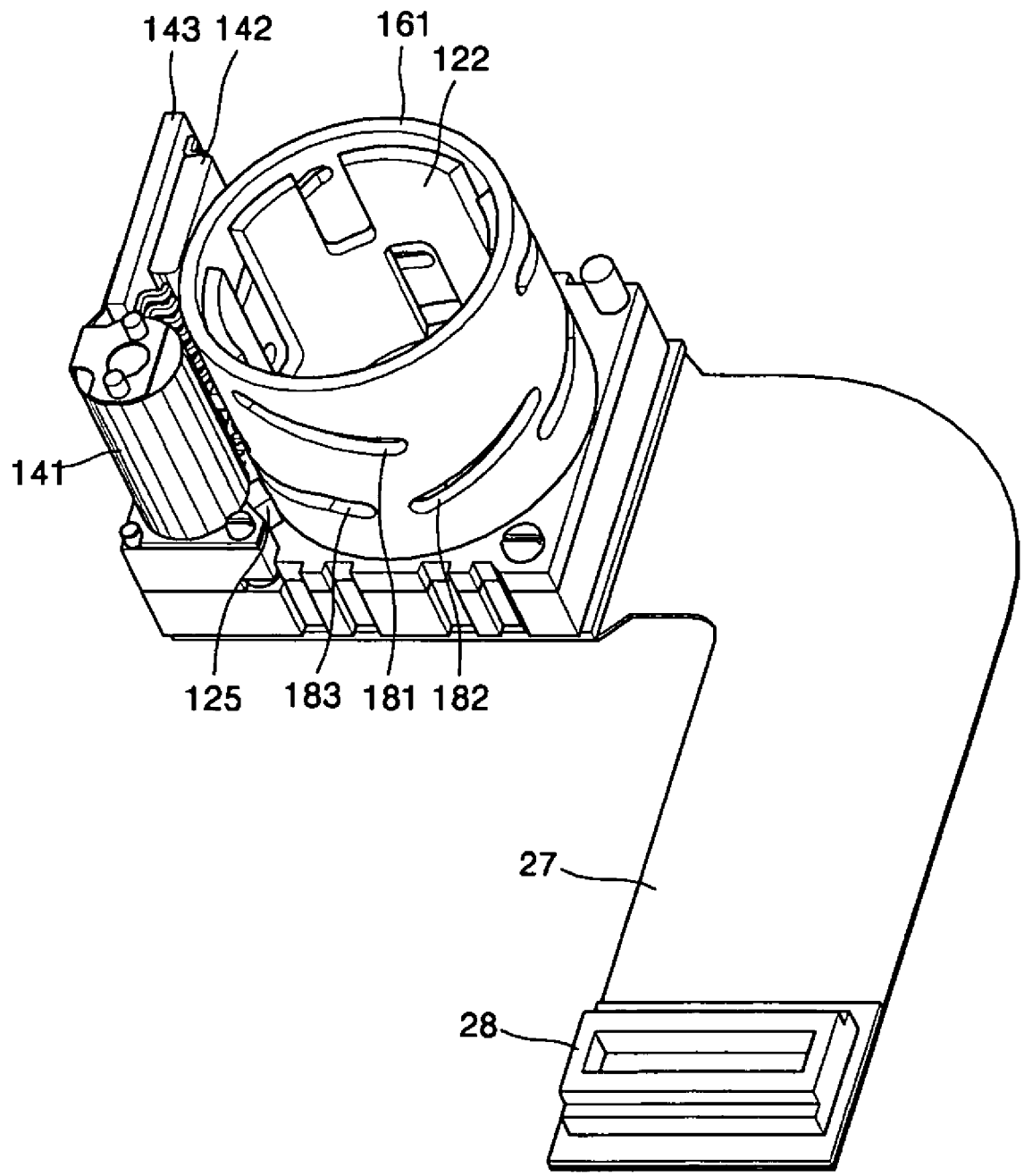

FIGS. 16 and 17 show that the cam barrel 161 is positioned outside the lens guide base cylinder member 122. The cam barrel 161 is cylindrical and rotatably coupled with the lens guide base 121. The cam barrel gear portion 175 is disposed at a predetermined location on an outer circumference of the cam barrel 161. That is, as can be seen from FIG. 17, the cam barrel gear portion 175 disposed on the outer circumferential surface of the cam barrel 161 is engaged with the transmission gear 106 described with reference to FIG. 10. Thus, when the transmission gear 106 is rotated by the driving motor 141, the cam barrel 161 is rotated accordingly.

Figure 20:
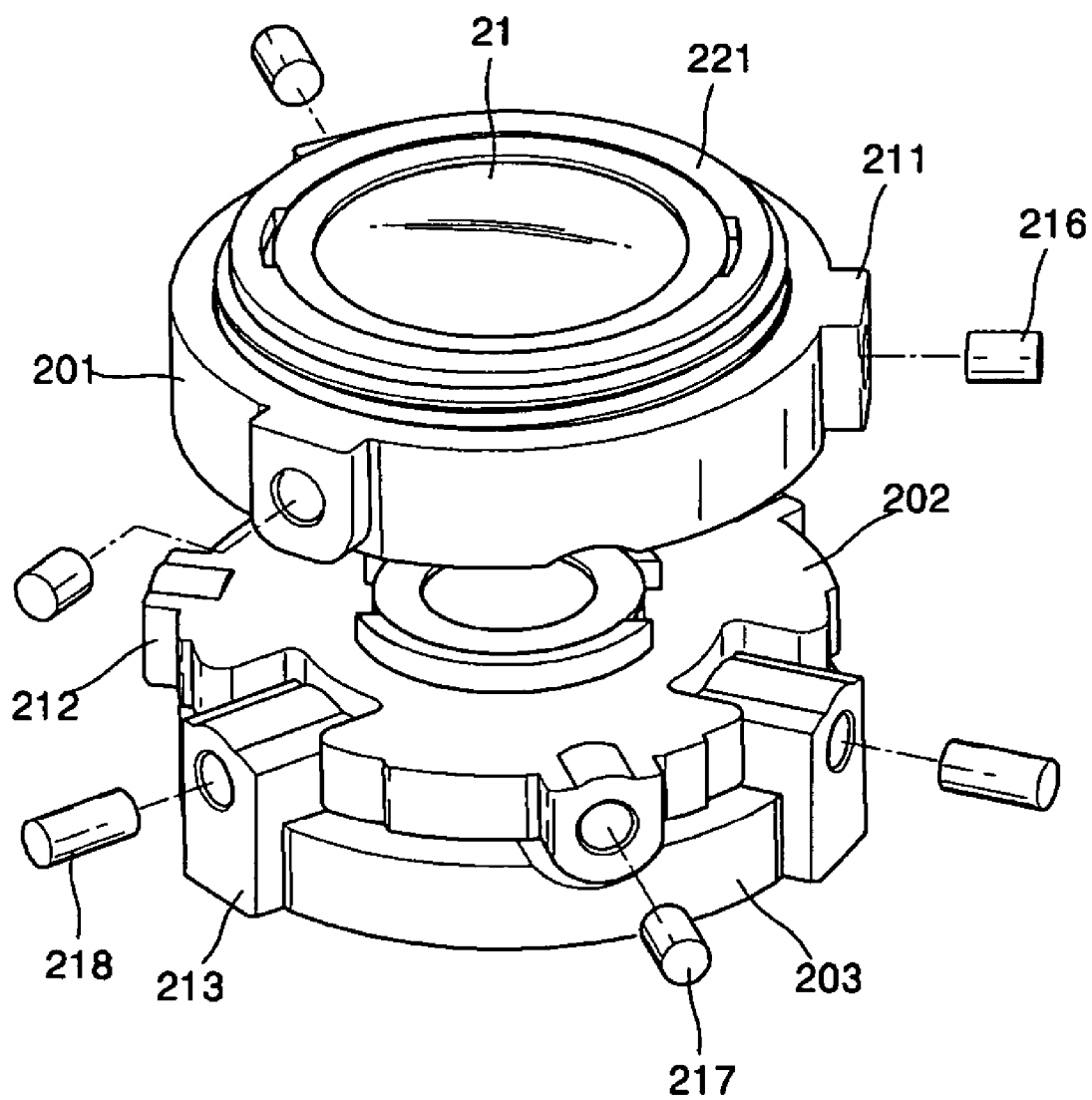
FIG. 20 is an exploded perspective view of a lens frame of the invention having lenses inserted therein.

At least two groups (sets) of cam slots can be formed in the cam barrel 161. In the embodiment shown in the drawing figure, three sets of cam slots, that is, first, second, and third sets of cam slots 181, 182, and 183 are formed therein. At least two (e.g., three) sets of cam pins provided on the at least two (e.g., three) lens frames shown in FIG. 20 are respectively inserted in the corresponding cam slots 181, 182, and 183. In the example shown in the drawing, first through third cam pins 216, 217, and 218 provided on each of the lens frames 201, 202, and 203 are inserted in the corresponding cam slots 181, 182, and 183, respectively. Since the first through third cam slots 181, 182, and 183 are formed generally inclined with respect to a horizontal plane, when the cam barrel 161 rotates, the cam slots 181, 182, and 183 drive the cam pins 216, 217, and 218 of the lens frames 201, 202, and 203. Accordingly, the first through third lens frames 201, 202, and 203 can linearly move guided by the first through third linear guide grooves 131, 132, and 133 of the guide cylinder member 122. That is, the lens frames 201, 202, and 203 can move linearly by the combination of the linear guide operation of the linear guide grooves 131, 132, and 133 of the guide cylinder member 122 and the driving operation of the cam slots 181, 182, and 183 of the cam barrel 161.

Figure 18:
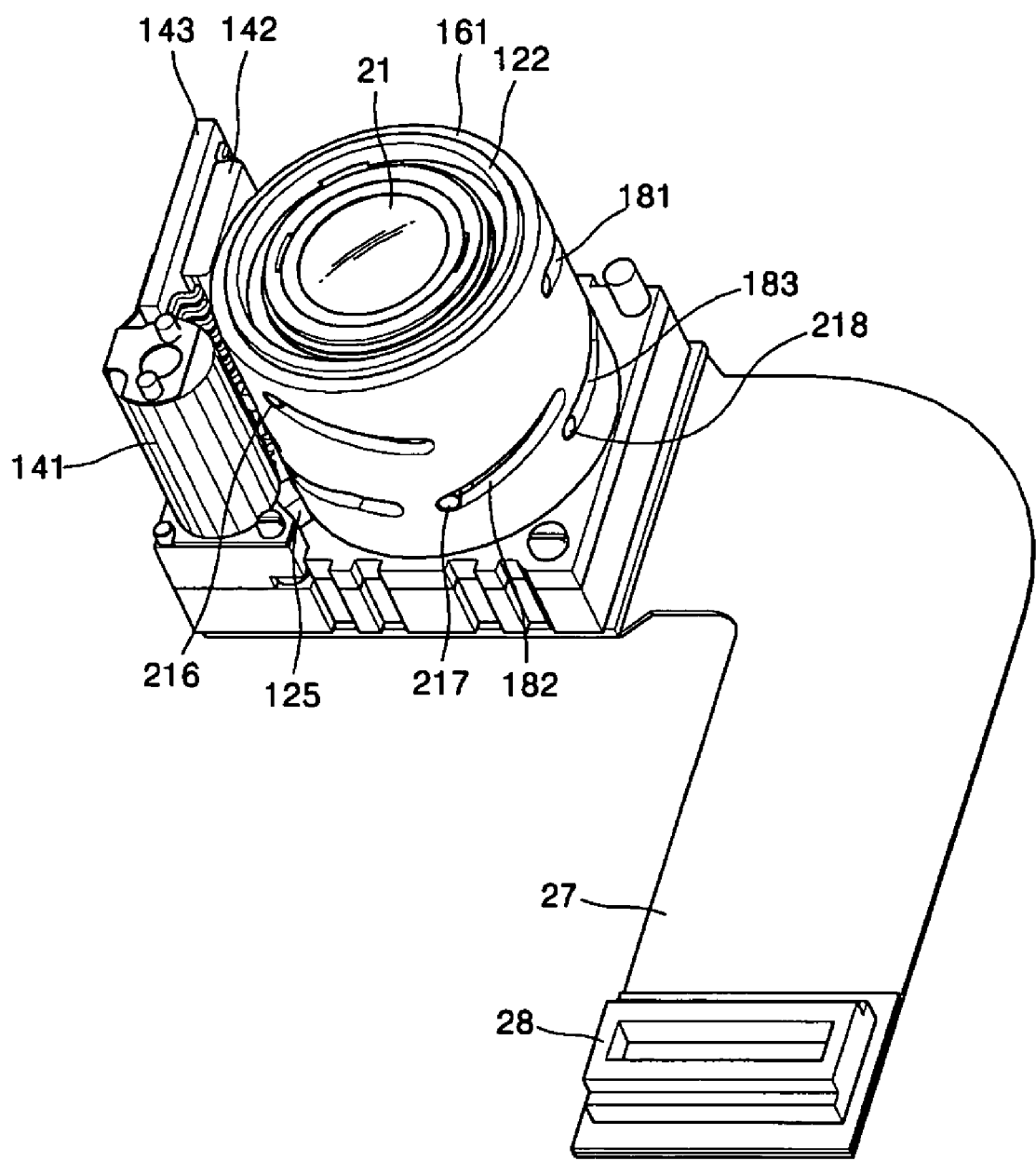
Figure 19:
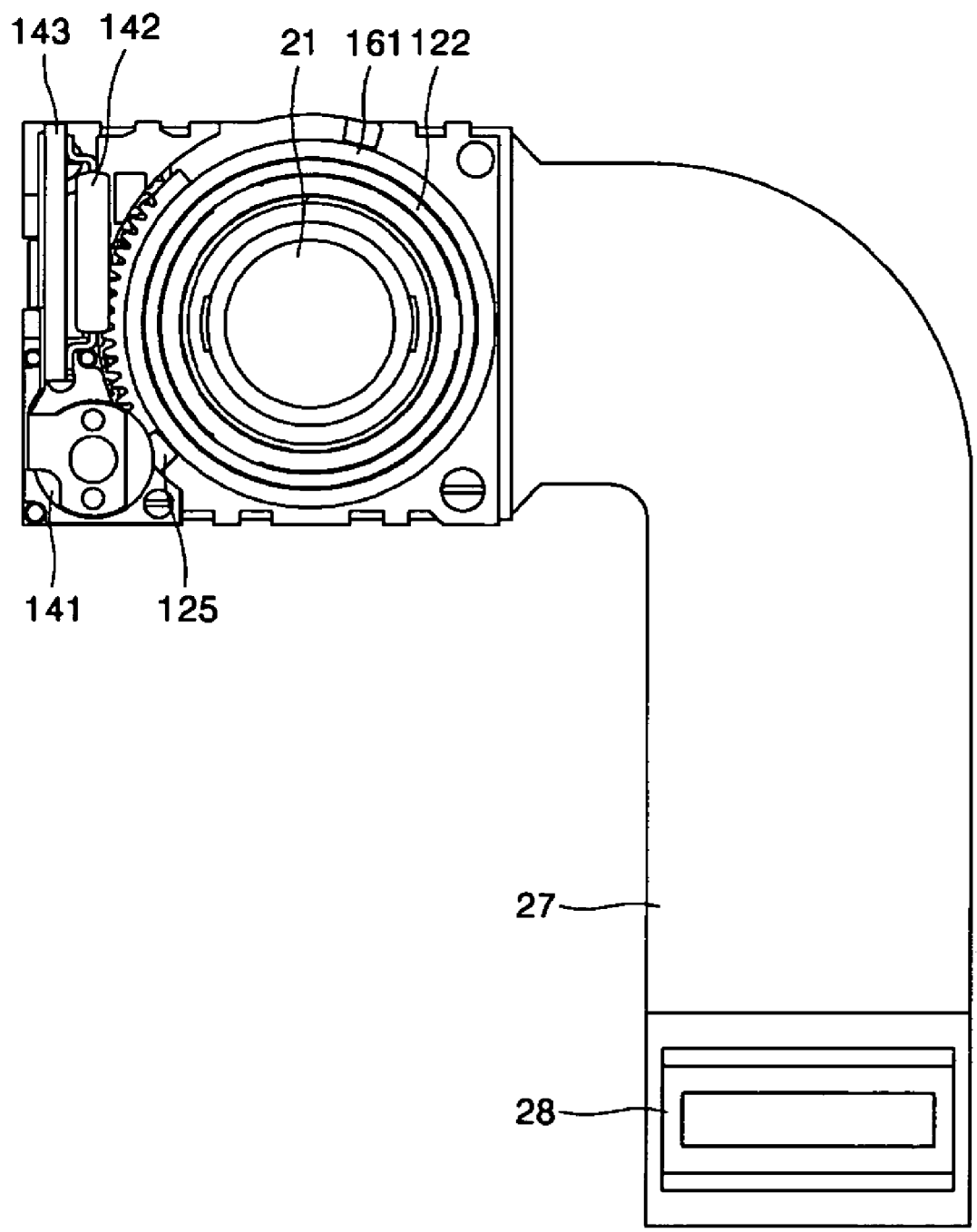

FIGS. 18 and 19 show a state in which the first through third lenses are coupled to the guide cylinder member 122 and the cam barrel 161. Referring to FIGS. 18 and 19, the first lens 21 is coupled with the guide cylinder member 122, and the second and third lenses 22 and 23 which are not shown in the drawings are also coupled with the guide cylinder member 122, with the lenses 21, 22, and 23 mounted on the corresponding lens frames 201, 202, and 203. The cam pins 216, 217, and 218 are respectively inserted in the corresponding cam slots 181, 182, and 183 formed in the cam barrel 161.

Figure 21:
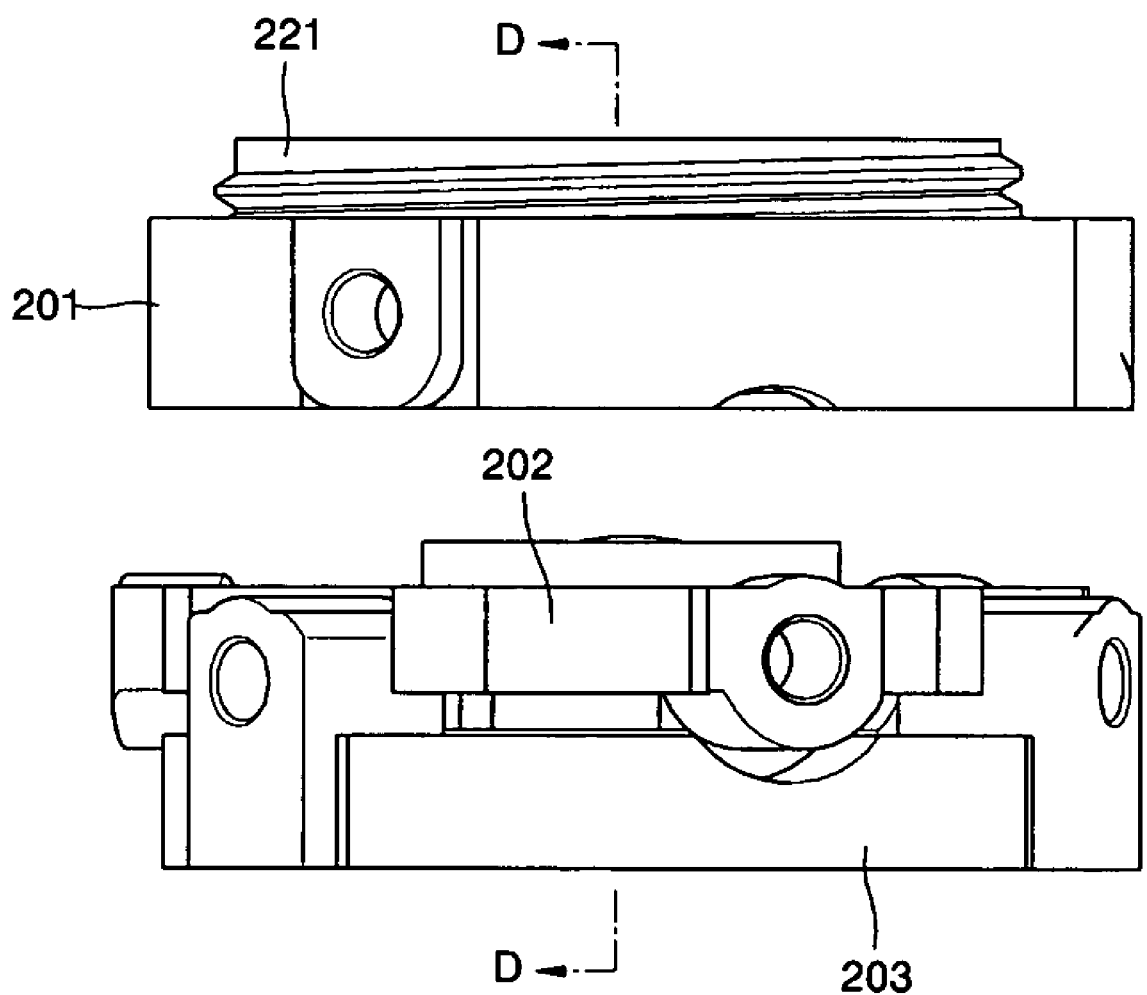
FIG. 21 is a front view of the lens frame of FIG. 20 in a disassembled state.
Figure 22:
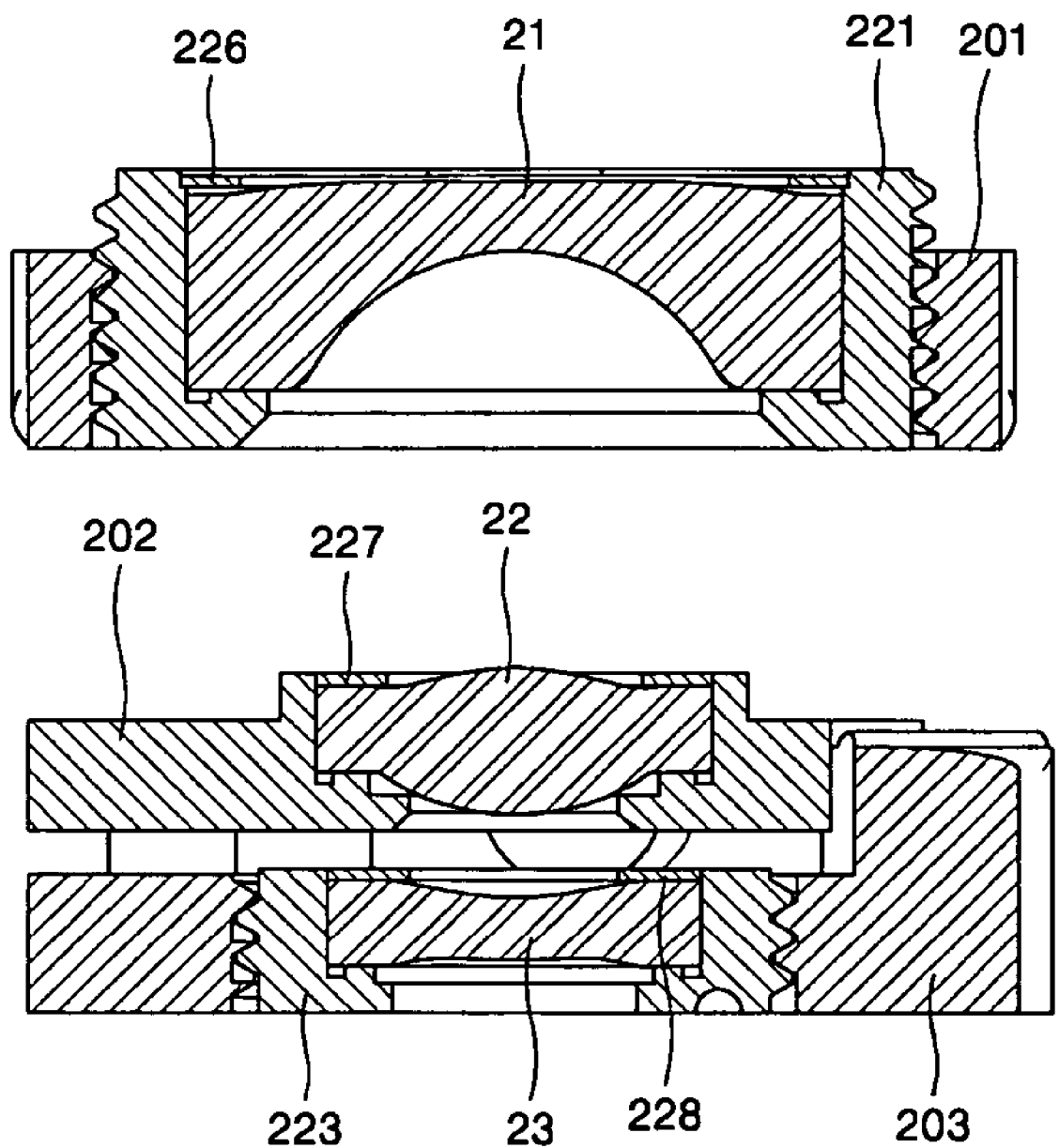
FIG. 22 is a sectional view taken along line D-D of FIG. 21.

FIGS. 20 through 22 show that the lenses 21, 22, and 23 are coupled with the corresponding lens frames 201, 202, and 203. Referring to FIG. 20, each of the lenses is installed inside a corresponding lens holder and the lens holder is in turn positioned within the corresponding lens frame. At least two linear guide portions are formed on each of the lens frames. In a preferred embodiment shown in the drawing figures, the first lens 21 is mounted in a lens holder 221 and the lens holder 221 is installed inside the first lens frame 201. Three first linear guide portions 211 are formed at an interval of 120° around the outer circumference of the first lens frame 201. Each of the first linear guide portions 211 slightly protrudes outwardly from the first lens frame 201 and has a pair of planar side surfaces parallel to each other and extending in a radial direction from the first lens frame 201. The first linear guide portions 211 are inserted in the first linear guide grooves 131 of the guide cylinder member 122 shown in FIG. 12 and are guided thereby. That is, the first linear guide portions 211 of the first lens frame 201 are guided linearly by the first linear guide grooves 131 of the guide cylinder member 122.

An insertion hole is formed at the lateral end face of each of the first linear guide portions 211 and first cam pin 216 is inserted in the insertion hole and fixed therein. Each of the first cam pins 216 is inserted in its corresponding first cam slot 181 (FIG. 16) formed in the cam barrel 161 and restricted thereby.

The second linear guide portions 212 and the third linear guide portions 213 are similarly formed at an interval of 120° around the outer circumferential surfaces of the second lens frame 202 and the third lens frame 203, respectively. The second and third linear guide portions 212 and 213 protrude outwardly from the circumferential surfaces of the respective lens frames and have planar side surfaces parallel to each other and extending in a radial direction from the lens frame. The second linear guide portions 212 and the third linear guide portions 213 are respectively inserted in their corresponding second and third linear guide grooves 132 and 133, as shown in FIG. 12.

Each of the second linear guide portion 212 has an insertion hole formed at the end face thereof and its corresponding second cam pin 217 is inserted in the insertion hole and fixed therein. An end portion of the second cam pin 217 is inserted in the second cam slot 182, which is described with reference to FIG. 16, and restricted thereby.

In FIG. 21 the second lens frame 202 and the third lens frame 203 are positioned close to each other, but they can be further separated.

FIG. 22 is a sectional view taken along line D-D of FIG. 21. As shown in FIG. 22, the first lens 21 is fixed at an inner circumferential surface of the lens holder 221 which is screwed into the inner space of the first lens frame 201. A first lens shield 226 is affixed at a front surface of the first lens 21 for limiting its optical path and also for protecting the first lens 21.

The second lens 22 is installed at an inner circumferential surface of the second lens frame 202. A second lens shield 227 is affixed at a front surface of the second lens 22 for limiting its optical path and also for protecting the second lens 22.

The third lens 23 is fixed at an inner circumferential surface of the lens holder 223 which is screwed into the inner space of the third lens frame 203. A third lens shield 228 is affixed at a front surface of the third lens 23 for limiting its optical path and also for protecting the third lens 23.

Figure 23:
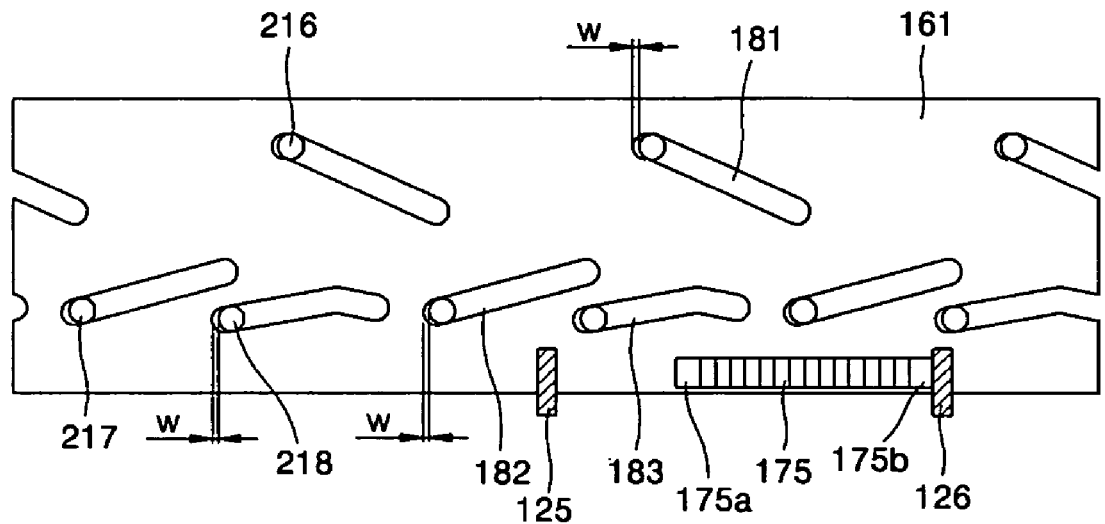
FIGS. 23 and 24 are views illustrating a cam barrel of the invention in a development state in which the cam barrel is stretched out for illustration purposes.
Figure 24:
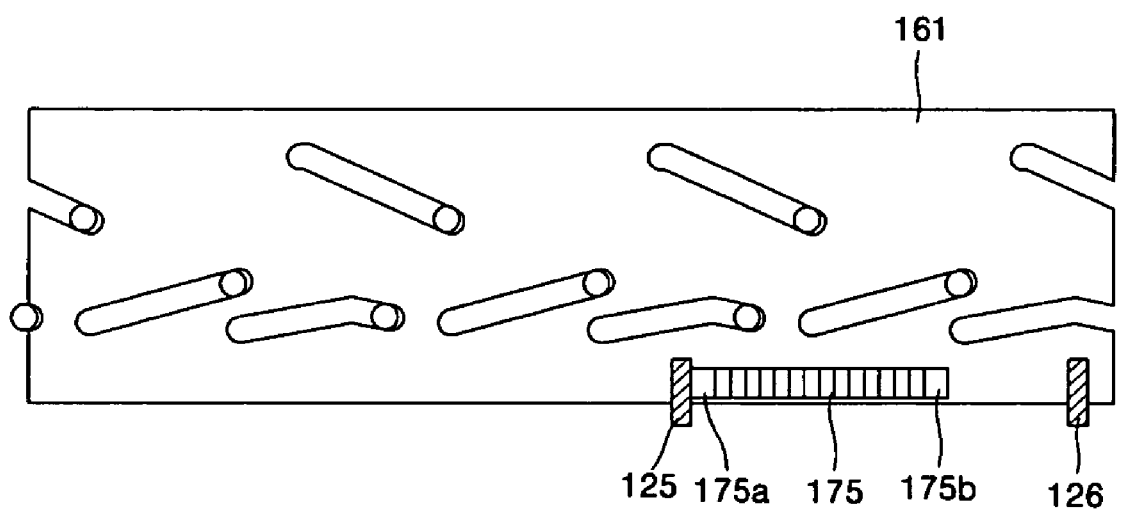

FIGS. 23 and 24 are views showing a surface of the cam barrel of FIG. 16, the surface being planarized only for illustration purposes. FIG. 23 shows the cam barrel in a Wide zoom state while FIG. 24 shows the cam barrel in a Tele zoom state.

Referring to FIGS. 23 and 24, the first through third cam slots 181, 182, and 183 are formed in the cam barrel 161. The first cam slots 181 and the second cam slots 182 are inclined in the opposite directions to each other. That is, the first cam slots 181 are inclined such that a left end thereof is located higher than a right end while the second cam slots 182 are inclined such that a right end thereof is located higher than a left end. The third cam slots 183 have generally a reversed V shape. The first through third cam pins 216, 217, and 218 are inserted in the first through third cam slots 181, 182, and 183, respectively. In the Wide zoom state (FIG. 23), the respective cam pins 216, 217, and 218 are approached at the left end portions of the respective cam slots 181, 182, and 183, respectively. Here, the side surface 175a of the cam barrel gear portion 175 formed at a lower portion of the outer circumferential surface of the cam barrel 161 contacts the Wide-limit protruding portion 125, so that the cam barrel 161 is prevented from rotating further.

On the contrary, in the Tele zoom state (FIG. 24), the respective cam pins 216, 217, and 218 are approached at the right end portions of the respective cam gear portions 181, 182, and 183, respectively. Here, the side surface 175b of the cam barrel gear portion 175 formed at a lower portion of the outer circumferential surface of the cam barrel 161 contacts the Tele-limit protruding portion 126, so that the cam barrel 161 is prevented from rotating further.

Actually, when the side surface 175a or 175b of the cam barrel gear portion 175 contacts the Wide limit protruding portion 125 or the Tele limit protruding portion 126, that is, in the full Wide or Tele zoom state, an allowance "W" exists between each of the respective cam pins 216, 217, and 218 and the left-most end of each of the slots 181, 182, and 183. By forming the cam slots 181, 182, and 183 to have such an allowance, the cam pins 216, 217, and 218 are prevented from an impact and escaping from the insertion holes.

Figure 25:
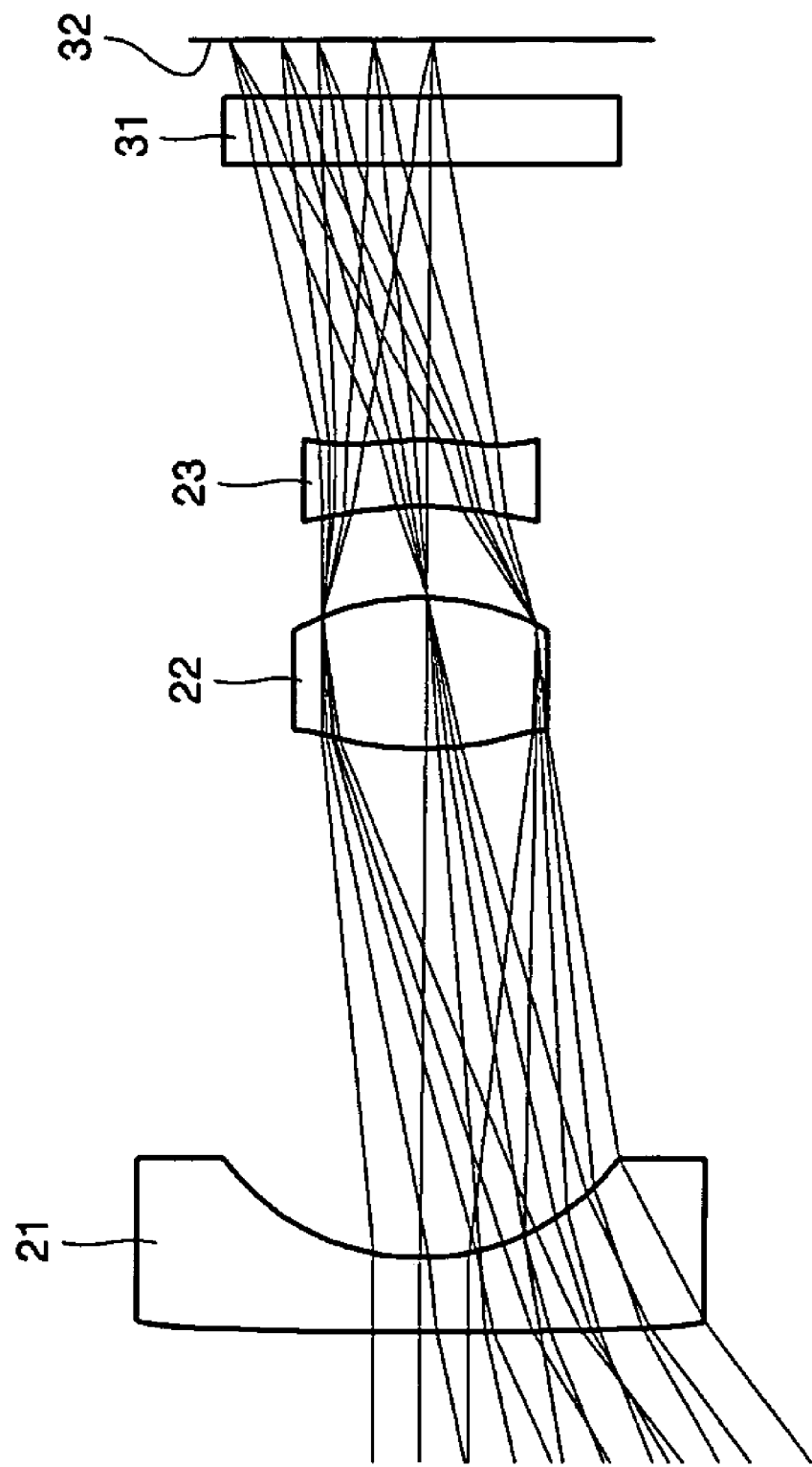
FIGS. 25 through 27 are sectional views showing the relative positions of first through third lenses corresponding to respective zoom states.
Figure 26:
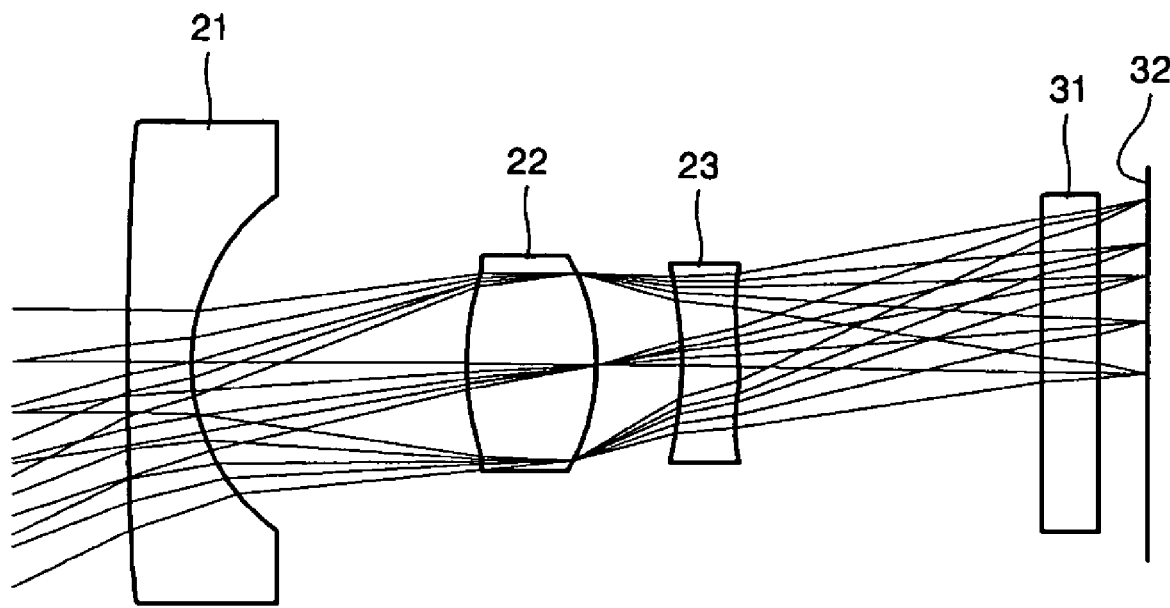
Figure 27:
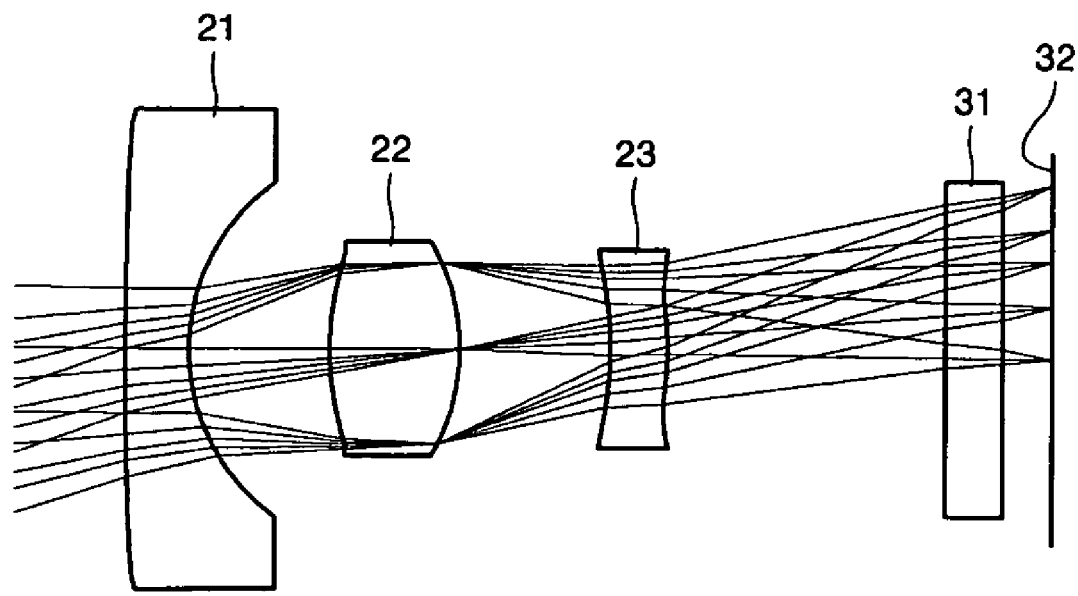

FIGS. 25 through 27 show the relative positions of first through third lenses corresponding to zoom states and the optical paths according to the lens positions.

Referring to FIG. 25, the first, second, and third lenses 21, 22, and 23 are axially arranged and light passing through the lenses are incident on the image sensor 32 through the infrared ray shielding filter 31.

FIG. 25 shows a Wide zoom state in which the first lens 21 is displaced farthest from the image sensor 32 within a linear movement limit of the first lens 21 while the second and third lenses 22 and 23 are displaced closest to the image sensor 32 within linear movement limits of the second and third lenses 22 and 23.

FIG. 27 shows a Tele zoom state in which the first lens 21 is displaced closest to the image sensor 32 within the linear movement limit of the first lens 21 while the second lens 22 is displaced farthest from the image sensor 32 with the linear movement limit of the second lens 22. The third lens 23 is displaced farther from the image sensor 32 than the position shown in FIG. 25.

FIG. 26 shows an intermediate state between the Wide zoom state and the Tele zoom state, in which the first lens 21 and the second lens 22 are displaced at a position in the middle of their linear movement limits. On the contrary, the third lens 23 is displaced farthest from the image sensor 32 within the linear movement limit thereof.

Figure 28:
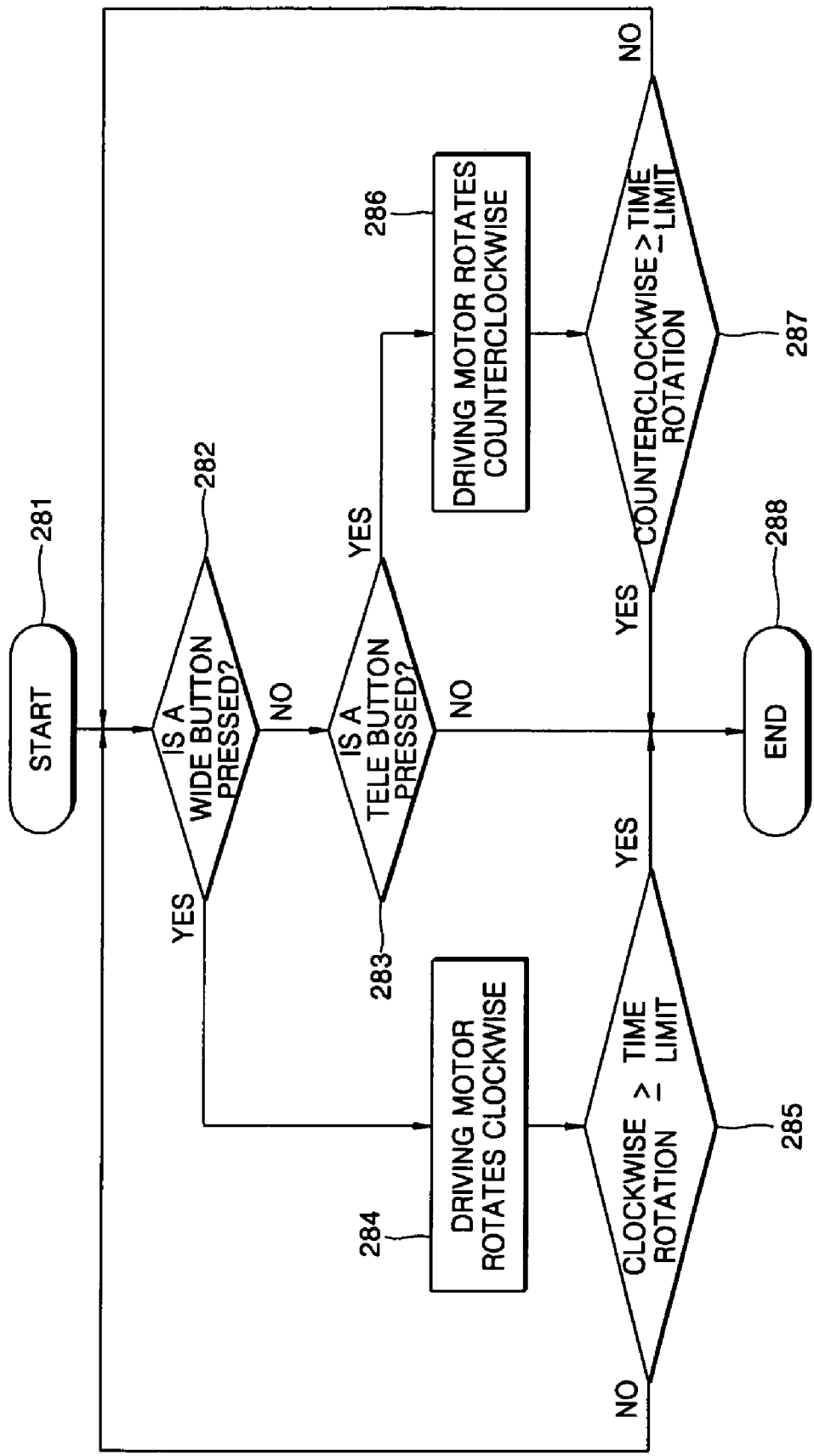
FIG. 28 is a flow chart showing a method of controlling a driving motor of a digital zoom camera of the invention.

FIG. 28 is a flow chart for explaining a method of controlling the rotation of the driving motor 141. A DC motor is preferably used as the driving motor so that a member to control the rotation of the DC motor is needed. In the present preferred embodiment, even when the user unnecessarily presses the Tele button 9 of FIG. 1 and the Wide button 10 of FIG. 1 for a long time, an overload applied to the DC motor can be prevented by limiting the rotation amount or time of the DC motor within a predetermined limit. The limit in the rotation time can be set by a time during which the zoom lenses can move from the full Tele state to the full Wide state, or vice versa.

Referring to the flow chart of FIG. 28, when a zoom operation starts by pressing the Tele button 9 or Wide button 10 (Step 281), it is determined whether an input signal is generated from the Tele button or from the Wide button (Step 282 and 283). If the input signal is generated from the Wide button, the driving motor rotates clockwise (Step 284). Next, it is determined whether the rotation time of the driving motor exceeds a time limit (Step 285). If the rotation time of the driving motor exceeds the time limit, the algorithm is terminated (Step 288). Otherwise, the driving motor continues to rotate by feedback. If the input signal is generated from the Tele button (Step 283), the driving motor rotates counterclockwise (Step 286). Next, it is determined whether the rotation time of the driving motor exceeds the time limit (Step 287). When the rotation time of the driving motor exceeds the time limit, the driving motor stops rotation (Step 288). Otherwise, the driving motor continues to rotate by feedback.

Figure 29:
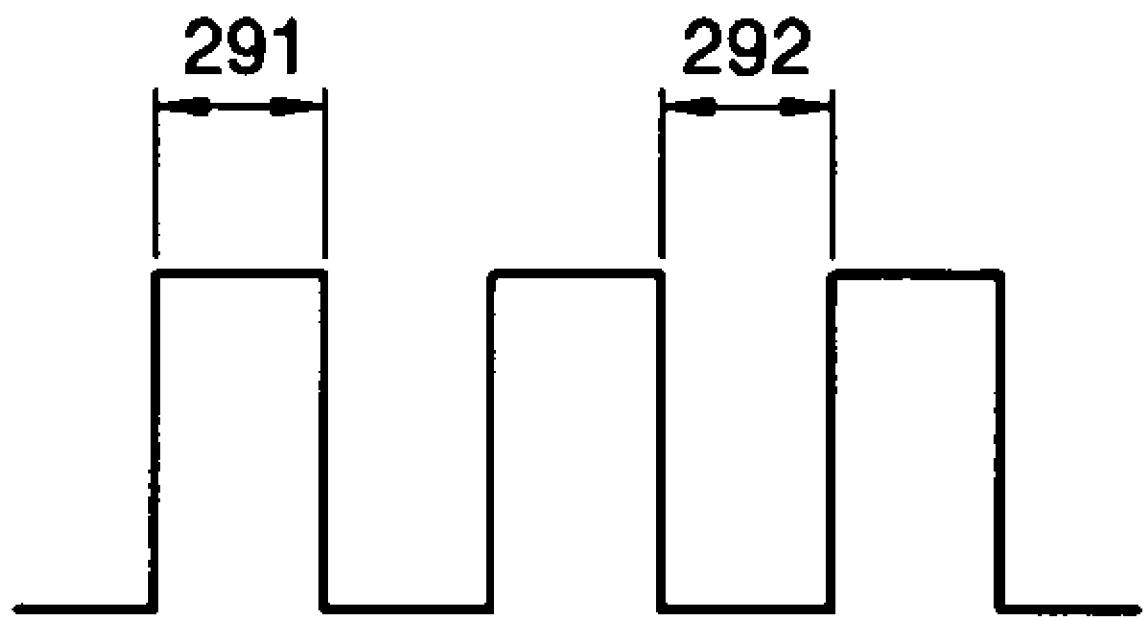
FIG. 29 is a waveform diagram of a power signal applied to a driving motor of the digital zoom camera of the invention.

FIG. 29 shows a waveform of a voltage signal of the power applied to the DC driving motor 141 provided in the present invention. The power is applied in form of a pulse waveform so that a portion 291 for applying the power and a portion 292 for not applying the power repeatedly alternate. By applying the power having such an alternate pulse waveform to the DC driving motor, the driving motor can be prevented from being accelerated and a response speed is fast when it is required to be stopped.

Figure 30:
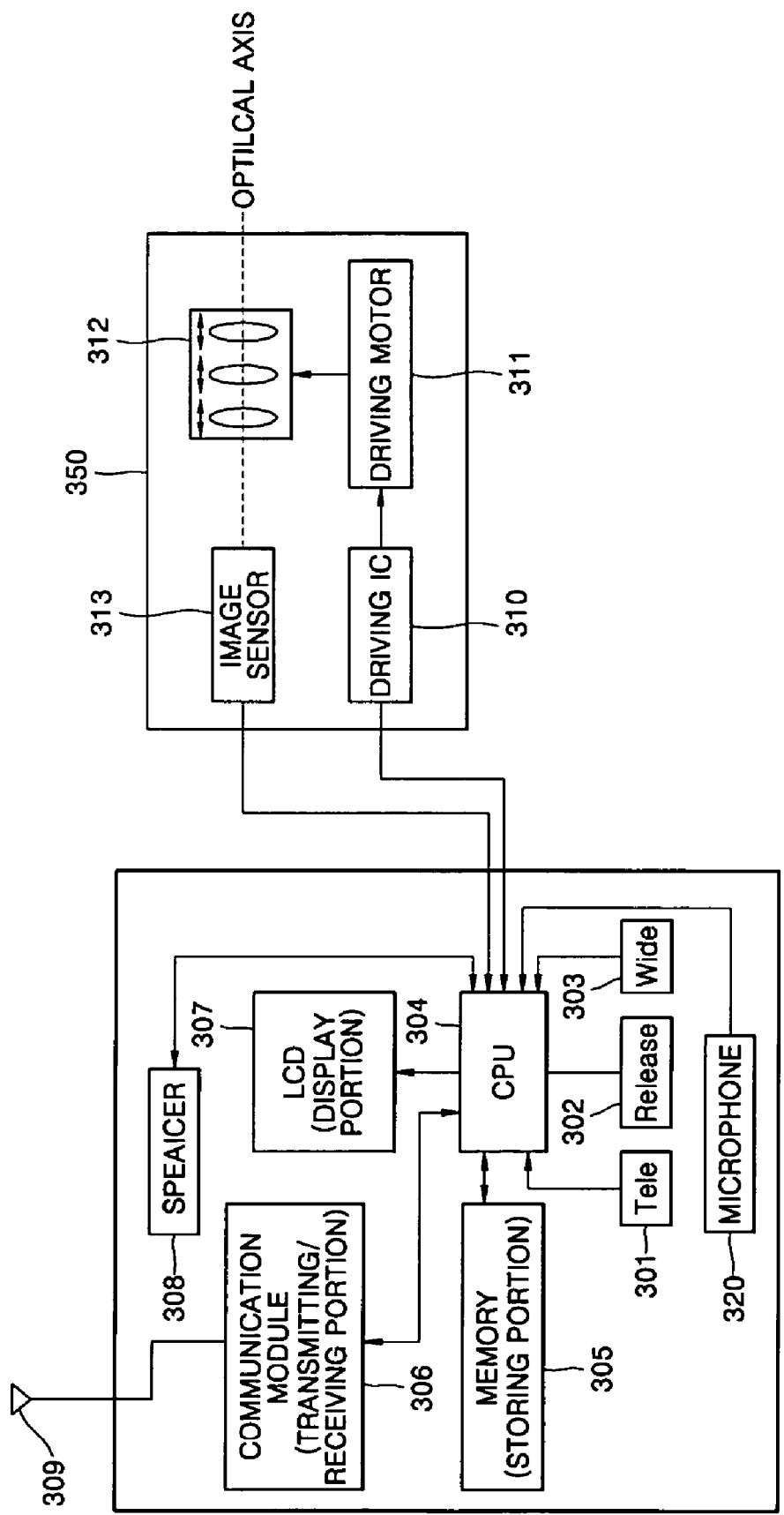
FIG. 30 is a block diagram showing a state in which the compact digital zoom camera according to the present invention is installed in a cellular phone.

FIG. 30 shows a schematic block diagram in which the compact digital zoom camera of the present invention is installed in a cellular phone. Referring to FIG. 30, a cellular phone includes a communication module 306 and a compact zoom camera module 350. A digital signal received through an antenna 309 is transmitted to a speaker 308 through the communication module 306 and a CPU 304. A voice signal received by a microphone 320 is transmitted to the antenna 309 through the CPU 304 and the communication module 306. The CPU 304 performs a predetermined operation by using data stored in a memory 305. An LCD or display portion 307 displays processed data corresponding to the commands from the CPU 304.

A zoom camera operation signal input through the Tele button 301 (9 in FIG. 1) and the Wide button 303 (10 in FIG. 1) is transmitted to the driving IC 310 of the camera 350 through the CPU 304. As the driving motor 311 (141 in FIG. 14) is rotated by the driving IC 310, the zoom state of a lens assembly 312 can be changed. Light input through the lens assembly 312 is focused on an image sensor 313 and transmitted to the CPU 304. When a user presses a release button 302, an image formed on the image sensor 313 can be stored in a memory 305 as a digital image.

As described above, the compact zoom camera according to the present invention has a simplified structure so that a possibility of becoming out of order and malfunctioning is reduced. Also, when there is an external impact, a possibility of being damaged is very low, in particular, the problem that the lens slips out of a portable device or a cam pin is broken can be prevented as described above. In addition, by incorporating a compact zoom camera module into a compact portable device, a camera performance and a photographing effect can be effectively coupled with the portable device. The camera of the invention is described in association mainly with a cellular phone, the invention is however not limited thereto. Any suitable electric devices may incorporate the features of the invention.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A zoom camera for use with an electronic device, comprising:
   a base member having an image sensor coupled thereto;
   a guide cylinder member including at least two groups of linear guide grooves formed in a lengthwise direction of the guide cylinder member;
   a driving motor for providing a rotational force;
   a cam barrel coupled to an outer circumference of the guide cylinder member and including at least two groups of cam slots formed therein the cam barrel and the guide cylinder member adapted to provide a relative rotation with respect to each other in response to the rotational force of the driving motor;
   at least two lens frames each having at least two linear guide portions radially extending outwards and respectively inserted in the corresponding linear guides grooves of the guide cylinder member for guiding the lens frames thereby, the lens frames having a plurality of cam pins radially extending outwards from the linear guide portions and respectively inserted in the corresponding cam slots of the cam barrel for guiding movement of the lens frames;
   at least two lenses respectively fixed in the corresponding lens frames; and
   a connector for connecting the zoom camera to the electronic device.

2. The zoom camera as claimed in claim 1, wherein the driving motor is a DC driving motor.

3. The zoom camera as claimed in claim 1, wherein a voltage signal waveform of a power applied to the driving motor is a pulse waveform having a portion for applying the power and a portion for not applying the power, and the power is applied within a time limit for moving the lenses between a full Tele zoom position and a full Wide zoom position.

4. The zoom camera as claimed in claim 1, wherein the at least two groups of linear guide grooves of the guide cylinder member are formed at an interval of 120° around the guide cylinder member.

5. The zoom camera as claimed in claim 1, wherein the cam barrel has three groups of cam slots, and two groups of the cam slots are inclined in the opposite direction to each other, and the other one group of the cam slots have a generally reversed V shape.

6. The zoom camera as claimed in claim 1, wherein an allowance is formed between a first end portion of each of the cam slots and the corresponding cam pin when the cam barrel is in the Tele zoom state, and another allowance is formed between a second end portion of each of the cam slots and its corresponding cam pin when the cam barrel is in the Wide zoom state.

7. The zoom camera as claimed in claim 1, wherein at least two lens shields are respectively affixed on their corresponding lenses for limiting an optical path and protecting the lenses.

8. The zoom camera as claimed in claim 1 further including a gear train coupled to the base member, wherein the gear train comprises:
   a motor gear connected to a rotation shaft of the driving motor;
   at least one reduction gear to reduce the rotation speed of the driving motor; and
   a transmission gear engaged with the at least one reduction gear and configured to rotate the cam barrel.

9. The zoom camera as claimed in claim 8, wherein the gear train is inserted in a groove formed in an upper surface of the base member.

10. The zoom camera as claimed in claim 1, wherein a filter is disposed in front of the image sensor.

11. The zoom camera as claimed in claim 1, wherein the base member includes a module base and a lens guide base.

12. The zoom camera as claimed in claim 11 further including a gear train coupled to the module base for rotating the cam barrel.

13. The zoom camera as claimed in claim 12, wherein the gear train is mounted in a groove formed at one surface of the module base, and a filter is mounted in a groove formed at opposite surface of the module base such that the overall thickness of the zoom camera can be reduced.

14. The zoom camera as claimed in claim 13, wherein the gear train mounting groove is formed at a location that does not overlap the filter mounting groove formed at the opposite surface of the module base such that the overall thickness of the zoom camera can further be reduced.

15. The zoom camera as claimed in claim 12, wherein the lens guide base is disposed above the module base and the guide cylinder member is coupled with the lens guide base.

16. The zoom camera as claimed in claim 1, wherein the base member includes a PCB on which the image sensor is disposed.

17. The zoom camera as claimed in claim 1, wherein the guide cylinder member is stationary and the cam barrel is rotatable relative to the guide cylinder member.

18. The zoom camera as claimed in claim 1 further including a motor driving IC for driving the driving motor.

19. The zoom camera as claimed in claim 1, wherein the base member includes a motor installation portion and the driving motor is mounted on the motor installation portion.

20. The zoom camera as claimed in claim 19, wherein the motor installation portion includes at least one protrusion for limiting rotation of the cam barrel beyond a predetermined position.

21. The zoom camera as claimed in claim 1, wherein the zoom camera has three lenses fixed in the corresponding lens frames.

22. A cellular phone having a zoom camera incorporated thereto, the zoom camera comprising:
   a base member having an image sensor coupled thereto;
   a guide cylinder member including at least two groups of linear guide grooves formed in a lengthwise direction of the guide cylinder member;
   a driving motor for providing a rotational force;
   a cam barrel coupled to an outer circumference of the guide cylinder member and including at least two groups of cam slots formed therein the cam barrel and the guide cylinder member adapted to provide a relative rotation with respect to each other in response to the rotational force of the driving motor;
   at least two lens frames each having at least two linear guide portions radially extending outwards and respectively inserted in the corresponding linear guides grooves of the guide cylinder member for guiding the lens frames thereby the lens frames having a plurality of cam pins radially extending outwards from the linear guide portions and respectively inserted in the corresponding cam slots of the cam barrel for guiding movement of the lens frames; and at least two lenses respectively fixed in the corresponding lens frames.

23. A portable digital device having a zoom camera incorporated thereto, the zoom camera comprising:
a base member having an image sensor coupled thereto;
a guide cylinder member including at least two groups of linear guide grooves formed in a lengthwise direction of the guide cylinder member;
a driving motor for providing a rotational force;
a cam barrel coupled to an outer circumference of the guide cylinder member and including at least two groups of cam slots formed therein the cam barrel and the guide cylinder member adapted to provide a relative rotation with respect to each other in response to the rotational force of the driving motor;
at least two lens frames each having at least two linear guide portions radially extending outwards and respectively inserted in the corresponding linear guide grooves of the guide cylinder member for guiding the lens frames thereby the lens frames having a plurality of cam pins radially extending outwards from the linear guide portions and respectively inserted in the corresponding cam slots of the cam barrel for guiding movement of the lens frames; and
at least two lenses respectively fixed in the corresponding lens frames.

24. A digital zoom camera comprising:
a module base having an image sensor therein;
an infrared ray shielding filter arranged in front of the image sensor in the module base;
a gear train inserted in a groove formed in an upper surface of the module base;
a lens guide base disposed on the module base and having a guide cylinder member integrally formed thereon, the guide cylinder member having at least two groups of linear guide grooves formed in a lengthwise direction thereof;
a driving motor mounted on the lens guide base to rotate the gear train; a cam barrel rotatably coupled at an outer side of the guide cylinder member and having a cam barrel gear portion engaged with the gear train and at least two groups of cam slots formed around the cam barrel;
at least two lens frames each having at least two linear guide portions radially extending outwards and respectively inserted in the corresponding linear guide grooves of the guide cylinder member for guiding the lens frames thereby, the lens frames having a plurality of cam pins radially extending outwards from the linear guide portions and respectively inserted in the corresponding cam slots of the cam barrel for guiding movement of the lens frames; and
at least two lenses respectively fixed in their corresponding lens frames.

25. A digital zoom camera comprising:
a module base having an image sensor coupled thereto;
a gear train mounted on the module base;
a driving IC for controlling a driving motor;
a lens guide base disposed on the module base and having a guide cylinder member disposed thereon, the guide cylinder member including a linear guide groove formed in a lengthwise direction thereof;
the driving motor mounted on the lens guide base to rotate the gear train;
a cam barrel rotatably coupled at an outer side of the guide cylinder member and having a cam barrel gear portion engaged with the gear train and at least two cam slots formed around the cam barrel;
at least two lens frames each including a linear guide portion radially extending outwards and inserted in the corresponding linear guide groove of the guide cylinder member for guiding the lens frames thereby, each of the lens frames including a cam pin radially extending outwards from the linear guide portion and inserted in the corresponding cam slot of the cam barrel for guiding movement of the lens frames; and
at least two lenses respectively fixed in their corresponding lens frames.

* * * * *